US012270442B2

(12) United States Patent
Suzuki

(10) Patent No.: US 12,270,442 B2
(45) Date of Patent: Apr. 8, 2025

(54) PAD CLIP FOR DISC BRAKE APPARATUS AND DISC BRAKE APPARATUS

(71) Applicant: AKEBONO BRAKE INDUSTRY CO., LTD., Tokyo (JP)

(72) Inventor: Sean Suzuki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 371 days.

(21) Appl. No.: 17/858,177

(22) Filed: Jul. 6, 2022

(65) Prior Publication Data
US 2023/0010464 A1  Jan. 12, 2023

(30) Foreign Application Priority Data

Jul. 7, 2021  (JP) .................... 2021-112773

(51) Int. Cl.
*F16D 65/09* (2006.01)
*F16D 55/22* (2006.01)
(Continued)

(52) U.S. Cl.
CPC ........ *F16D 65/0977* (2013.01); *F16D 55/226* (2013.01)

(58) Field of Classification Search
CPC .. F16D 65/09; F16D 65/0972; F16D 65/0977; F16D 65/0978; F16D 65/097;
(Continued)

(56) References Cited

U.S. PATENT DOCUMENTS 5,901,815 A * 5/1999 Kobayashi .......... F16D 65/0972
188/205 A
5,954,163 A * 9/1999 Suzuki .................. F16D 55/227
188/73.38

(Continued)

FOREIGN PATENT DOCUMENTS

JP  2015-090201 A   5/2015
WO  WO-2020059823 A1 * 3/2020 ........... F16D 55/228

OTHER PUBLICATIONS

WO-2020059823-A1, PE2E machine translation, 15 pages (Year: 9/24).*

Primary Examiner — Bradley T King
Assistant Examiner — James K Hsiao
(74) Attorney, Agent, or Firm — Faegre Drinker Biddle & Reath LLP

(57) ABSTRACT

A pad clip in which a circumferential dimension from a first contact portion in contact with a side surface of a coupling portion, which is disposed on the other side in the circumferential direction, on the one side in the circumferential direction in a fixing portion disposed on the other side to a side surface of a sandwiched plate portion on the one side is available to be set independently of a circumferential dimension from a first contact portion to a second contact portion in contact with the side surface of the coupling portion, which is disposed on the one side, on the other side in the fixing portion disposed on the one side. The side surface of the sandwiched plate portion is in surface contact with a torque-receiving surface regardless of bending deformation generated in a main body portion based on elastic deformation of a pressing portion.

9 Claims, 20 Drawing Sheets

(51) Int. Cl.
*F16D 65/097* (2006.01)
*F16D 55/226* (2006.01)

(58) Field of Classification Search
CPC .... F16D 55/226; F16D 55/225; F16D 65/183; F16D 55/22; F16D 2121/16; F16D 2055/0041; F16D 2055/077
See application file for complete search history.

(56) References Cited

U.S. PATENT DOCUMENTS

| | | | | |
|---|---|---|---|---|
| 6,269,915 B1* | 8/2001 | Aoyagi | ............... | F16D 65/0972 188/73.38 |
| 6,478,122 B1* | 11/2002 | Demoise, Jr. | ....... | F16D 65/0977 188/73.38 |
| 7,455,153 B2* | 11/2008 | Ooshima | ............ | F16D 65/0979 188/73.38 |
| 9,377,071 B2* | 6/2016 | Shimamura | ............ | F16D 55/228 |
| 9,506,514 B1* | 11/2016 | Tekesky | ................ | F16D 55/226 |
| 9,689,445 B2* | 6/2017 | Merrien | ................ | F16D 55/228 |
| 10,030,729 B2* | 7/2018 | Foucoin | ................ | F16D 65/543 |
| 10,066,684 B2* | 9/2018 | Shin | .................... | F16D 65/0972 |
| 10,563,716 B2* | 2/2020 | Foucoin | ................ | F16D 55/227 |
| 11,209,056 B2* | 12/2021 | Salzmann | ............. | F16D 55/226 |
| 11,428,282 B2* | 8/2022 | Lee | ........................ | F16D 65/097 |
| 2004/0195057 A1* | 10/2004 | Ooshima | ............. | F16D 65/0972 188/73.38 |
| 2013/0192939 A1* | 8/2013 | V | ........................ | F16D 65/0972 188/73.38 |
| 2014/0131148 A1* | 5/2014 | Plantan | ............... | F16D 65/0972 188/73.31 |
| 2014/0311839 A1* | 10/2014 | Bernard | .............. | F16D 65/0972 188/250 F |
| 2015/0027822 A1* | 1/2015 | Cerutti | ................ | F16D 65/0977 188/73.47 |
| 2015/0122602 A1* | 5/2015 | Shimamura | ........... | F16D 55/228 188/250 E |
| 2015/0211589 A1* | 7/2015 | Mallmann | ........... | F16D 65/0977 188/73.38 |
| 2018/0023643 A1* | 1/2018 | Foucoin | .................. | F16D 65/40 188/73.32 |
| 2018/0051760 A1* | 2/2018 | Foucoin | ............. | F16D 65/0979 |
| 2019/0226539 A1* | 7/2019 | Kim | .................... | F16D 65/0972 |
| 2021/0062878 A1* | 3/2021 | Lee | ........................ | F16D 65/097 |
| 2021/0172488 A1* | 6/2021 | Park | .................... | F16D 65/0977 |
| 2021/0262542 A1* | 8/2021 | Inoue | ................. | F16D 65/0972 |
| 2021/0348661 A1* | 11/2021 | Egawa | ............... | F16D 65/0977 |

* cited by examiner

PAD CLIP FOR DISC BRAKE APPARATUS AND DISC BRAKE APPARATUS

CROSS-REFERENCE TO RELATED APPLICATIONS

The disclosure of Japanese Patent Application No. 2021-112773 filed on Jul. 7, 2021, including specification, drawings and claims is incorporated herein by reference in its entirety.

BACKGROUND

The present invention relates to a pad clip for a disc brake apparatus and a disc brake apparatus.

In a disc brake apparatus used to brake an automobile, a pair of pads are arranged on both sides of a rotor that rotates together with wheels, and the pair of pads are pressed against both side surfaces of the rotor during braking. In such a disc brake apparatus, the pads and a caliper that movably supports the pads collide with each other during braking, and an abnormal sound called a clonk sound (striking sound, click sound) may be generated. The clonk sound is mainly caused by a fact that a direction of a moment that acts on the pads during braking is opposite during forward braking and during backward braking.

In view of such circumstances, JP-A-2015-90201 discloses a structure of a disc brake apparatus in which directions of moments that act on pads during braking are made to coincide with each other during forward braking and during backward braking in order to prevent generation of a clonk sound. FIGS. 20 to 23 show a disc brake apparatus described in JP-A-2015-90201. A disc brake apparatus 100 includes a caliper 101 and a pair of pads 102 and 103 (an inner pad 102, an outer pad 103).

The caliper 101 supports the inner pad 102 and the outer pad 103 so as to be movable in an axial direction (an upper-lower direction in FIG. 20, a front-back direction in FIG. 21). Such a caliper 101 includes an inner body 105 and an outer body 106 arranged on axially both sides of a rotor 104 (see FIG. 20) that rotates together with wheels, both rotation-in-side and rotation-out-side coupling portions 107 and 108 that couple end portions of the inner body 105 and the outer body 106 on circumferentially both sides to each other, and an intermediate coupling portion 109 that couples circumferentially intermediate portions of the inner body 105 and the outer body 106 to each other.

Unless otherwise specified, an axial direction, a circumferential direction, and a radial direction refer to an axial direction, a circumferential direction, and a radial direction of the rotor 104.

Each of the inner body 105 and the outer body 106 includes a pin 110 and a guide recessed groove 111. Specifically, each of the inner body 105 and the outer body 106 includes the pin 110 at an end portion of a portion on one side in a circumferential direction on a radially inner side. The pair of pins 110 are arranged coaxially with each other. Further, each of the inner body 105 and the outer body 106 includes a guide wall portion 112 that protrudes in the axial direction on an axially inner surface of a portion on the other side in the circumferential direction. The guide recessed groove 111 opened in an axially inner surface and a surface on the one side in the circumferential direction is provided in a radially intermediate portion of the guide wall portion 112. In the shown example, the one side in the circumferential direction corresponds to a rotation-in side when a vehicle travels forward, and the other side in the circumferential direction corresponds to a rotation-out side when the vehicle travels forward.

Each of the inner pad 102 and the outer pad 103 includes a lining 113 and a back plate 114 that supports a back surface of the lining 113. The back plate 114 includes a through hole 115 in a radially inner portion of a portion on the one side in the circumferential direction (rotation-in-side end portion), and a convex ear portion 116 that protrudes in the circumferential direction on a side surface on the other side in the circumferential direction (rotation-out-side side surface).

In order to support the inner pad 102 and the outer pad 103 as described above so as to be movable in the axial direction with respect to the caliper 101, the pin 110 is inserted in the axial direction through the through hole 115 provided in the back plate 114. Accordingly, a portion on the one side in the circumferential direction of each of the inner pad 102 and the outer pad 103 is supported so as to be movable in the axial direction with respect to each of the inner body 105 and the outer body 106, and a brake tangential force F1 that acts on the inner pad 102 and the outer pad 103 is supported by the pins 110 during the forward braking. Further, the ear portion 116 provided on the back plate 114 is engaged with the guide recessed groove 111 so as to be movable in the axial direction.

A rotation-in-side coupling portion 107 includes a pair of torque-receiving surfaces 117 on a surface that faces an intermediate coupling portion 109 in the circumferential direction. Each of the pair of torque-receiving surfaces 117 supports a brake tangential force F2 that acts on the inner pad 102 and the outer pad 103 by being abutted against a torque transmission surface 118 provided on an end portion of a portion on the one side in the circumferential direction of the back plate 114 on a radially outer side during the backward braking.

The disc brake apparatus 100 includes a pad clip 119 in order to prevent rattling of the inner pad 102 and the outer pad 103 in a non-braking state.

The pad clip 119 is made of a metal plate, and includes a main body portion 120, a pair of rotation-in-side pressing portions 121a and 121b, a pair of rotation-out-side pressing portions 122a and 122b, and a pair of sandwiched plate portions 123a and 123b.

The main body portion 120 includes a base plate portion 124, and a first fixing portion 125 and a second fixing portion 126 arranged on circumferentially both sides of the base plate portion 124. The first fixing portion 125 includes a first standing plate portion 127 and a first push-up plate portion 128. The first standing plate portion 127 elastically presses the rotation-in-side coupling portion 107 toward the one side in the circumferential direction, and the first push-up plate portion 128 elastically presses the rotation-in-side coupling portion 107 radially outward. The second fixing portion 126 elastically sandwiches the intermediate coupling portion 109 from circumferentially both sides.

The rotation-in-side pressing portions 121a and 121b are provided on a circumferentially intermediate portion of the pad clip 119, and press portions on the one side in the circumferential direction of outer peripheral edge portions of the back plates 114 that constitute the inner pad 102 and the outer pad 103 radially inward.

The rotation-out-side pressing portions 122a and 122b are provided on an end portion of the pad clip 119 on the other side in the circumferential direction, and press portions on the other side in the circumferential direction of the outer peripheral edge portions of the back plates 114 that constitute the inner pad 102 and the outer pad 103 radially inward.

The sandwiched plate portions 123a and 123b are formed in a flat plate shape, and are arranged on axially both sides of the first fixing portion 125. The sandwiched plate portions 123a and 123b and the first standing plate portion 127 that constitutes the first fixing portion 125 are connected over a substantially entire width in the radial direction, and form a single flat plate. In other words, in the single flat plate, an axially intermediate portion is the first standing plate portion 127, and axially both side portions are the sandwiched plate portions 123a and 123b. Further, the sandwiched plate portions 123a and 123b are arranged between the torque-receiving surfaces 117 provided on the rotation-in-side coupling portion 107 and the torque transmission surfaces 118 provided on the back plates 114 that constitute the inner pad 102 and the outer pad 103.

The disc brake apparatus 100 generates moments in the following directions to the inner pad 102 and the outer pad 103 during braking. Hereinafter, description will be made with reference to FIG. 23.

As shown in FIG. 23A, during the forward braking, a brake tangential force F1 directed to the other side in the circumferential direction (a left side in FIG. 23A, a rotation-out side) acts on a friction surface center point A of the lining 113 that constitutes the inner pad 102 (and the outer pad 103). Then, the inner pad 102 (and the outer pad 103) slightly moves toward the other side in the circumferential direction, and the through hole 115 and the pin 110 provided on a radially inner side of an action line of the brake tangential force F1 are engaged with each other, so that the brake tangential force F1 is supported. Therefore, during the forward braking, a moment M1 that attempts to rotate the inner pad 102 (and the outer pad 103) counterclockwise acts on the inner pad 102 (and the outer pad 103).

On the contrary, as shown in FIG. 23B, during the backward braking, a brake tangential force F2 directed to the one side in the circumferential direction (a right side in FIG. 23B, a rotation-in side) acts on the friction surface center point A of the lining 113. Then, the inner pad 102 (and the outer pad 103) slightly moves toward the one side in the circumferential direction, and the torque transmission surface 118 provided on a surface of the back plate 114 on the one side in the circumferential direction on a radially outer side of an action line of the brake tangential force F2 is abutted against the torque-receiving surface 117 via the sandwiched plate portion 123a (123b), so that the brake tangential force F2 is supported. Therefore, during the backward braking, a moment M2 that is in the same direction as that of the moment M1 and attempts to rotate the inner pad 102 (and the outer pad 103) counterclockwise acts on the inner pad 102 (and the outer pad 103).

As described above, according to the disc brake apparatus 100 disclosed in JP-A-2015-90201, the directions of the moments M1 and M2 that act on the inner pad 102 and the outer pad 103 can be made to coincide with each other during the forward braking and during the backward braking. Therefore, even when the forward braking and the backward braking are repeated, postures of the inner pad 102 and the outer pad 103 can be maintained in a state where the inner pad 102 and the outer pad 103 are rotated counterclockwise. Therefore, since it is not necessary to change the postures of the inner pad 102 and the outer pad 103, the generation of the clonk sound can be prevented.

Further, both rotation-in-side and rotation-out-side pressing portions 121a, 121b, 122a, and 122b that constitute the pad clip 119 press circumferentially both side portions of the back plates 114 that constitute the inner pad 102 and the outer pad 103 radially inward. Therefore, in a non-braking state, a radially outer surface of an inner peripheral surface of the through hole 115 can be abutted against an end portion of an outer peripheral surface of the pin 110 on a radially outer side, and a radially inner surface of the ear portion 116 can be abutted against a radially inner surface of the guide recessed groove 111. Therefore, even in the non-braking state, the postures of the inner pad 102 and the outer pad 103 can be stabilized, and generation of brake noise can be prevented. Further, since the sandwiched plate portions 123a and 123b are arranged between the torque-receiving surface 117 and the torque transmission surface 118, generation of rust can be prevented between the torque-receiving surface 117 and the torque transmission surface 118.

Patent Literature 1: JP-A-2015-90201

SUMMARY

According to one advantageous aspect of the invention, there is provided a pad clip for a disc brake apparatus according to an aspect of the present invention is made of a metal plate, and is attached between a pair of coupling portions that are arranged to be separated from each other in a circumferential direction and that are configured to couple an inner body and an outer body in an axial direction to elastically press a pad. The pad clip for the disc brake apparatus includes a main body portion, a pressing portion, and a sandwiched plate portion.

The main body portion includes fixing portions on circumferentially both side portions, and is elastically supported between the pair of coupling portions in a state where the fixing portions are engaged with the coupling portions.

The pressing portion is configured to press an outer peripheral edge portion of the pad radially inward.

The sandwiched plate portion is disposed between a torque-receiving surface provided on a side surface of the coupling portion, which is disposed on one side in a circumferential direction, on the other side in the circumferential direction, and a radially outer portion of a side surface of the pad on the one side in the circumferential direction.

In the pad clip for the disc brake apparatus according to the aspect of the present invention, a circumferential dimension from a first contact portion in contact with a side surface of the coupling portion, which is disposed on the other side in the circumferential direction, on the one side in the circumferential direction in the fixing portion disposed on the other side in the circumferential direction to a side surface of the sandwiched plate portion on the one side in the circumferential direction is available to be set independently of a circumferential dimension from the first contact portion to a second contact portion in contact with the side surface of the coupling portion, which is disposed on the one side in the circumferential direction, on the other side in the circumferential direction in the fixing portion disposed on the one side in the circumferential direction.

Then, the side surface of the sandwiched plate portion on the one side in the circumferential direction is in surface contact with the torque-receiving surface regardless of bending deformation generated in the main body portion based on elastic deformation of the pressing portion.

In the pad clip for the disc brake apparatus according to the aspect of the present invention, an interference of the sandwiched plate portion with respect to the torque-receiving surface can be made larger than an interference of the fixing portion disposed on the one side in the circumferential direction with respect to the side surface of the coupling portion, which is disposed on the one side in the circumferential direction, on the other side in the circumferential direction.

In the pad clip for the disc brake apparatus according to the aspect of the present invention, in a free state (before being attached between the pair of coupling portions), a circumferential position of the side surface of the sandwiched plate portion on the one side in the circumferential direction and a circumferential position of the second contact portion can be made different from each other.

In the pad clip for the disc brake apparatus according to the aspect of the present invention, a cutout portion can be formed between the sandwiched plate portion and the fixing portion disposed on the one side in the circumferential direction in an axial direction.

In this case, the sandwiched plate portion can be connected to the fixing portion disposed on the one side in the circumferential direction via a connection portion formed by forming the cutout portion, and can be inclined in a direction toward the one side in the circumferential direction as the sandwiched plate portion is away from the connection portion in a radial direction or an axial direction in a free state.

Alternatively, the sandwiched plate portion can be connected to a circumferentially intermediate portion of the main body portion via a connection portion formed by forming the cutout portion.

Further, when the sandwiched plate portion is connected to the circumferentially intermediate portion of the main body portion via the connection portion, the sandwiched plate portion can be inclined in a direction toward the one side in the circumferential direction as the sandwiched plate portion is away from the connection portion in a radial direction or an axial direction in a free state.

In the pad clip for the disc brake apparatus according to the aspect of the present invention, in a free state, an inclination angle of the sandwiched plate portion with respect to the second contact portion can be set to be larger than 0 degrees and equal to or smaller than 20 degrees.

In the pad clip for the disc brake apparatus according to the aspect of the present invention, the sandwiched plate portions can be provided one by one on axially both sides of the fixing portion disposed on the one side in the circumferential direction.

In the pad clip for the disc brake apparatus according to the aspect of the present invention, the pressing portion can press the pad in a direction away from a rotor in an axial direction.

A disc brake apparatus according to an aspect of the present invention includes: a caliper including an inner body and an outer body arranged on axially both sides by sandwiching a rotor, and a pair of coupling portions configured to couple the inner body and the outer body in an axial direction; a pad supported so as to be movable in an axial direction with respect to the caliper; and a pad clip that is made of a metal plate, is attached between the pair of coupling portions, and is configured to elastically press the pad, in which the pad clip for the disc brake apparatus according to the aspect of the present invention can be used as the pad clip.

BRIEF DESCRIPTION OF DRAWINGS

FIG. 22A is a plan view of the pad clip when viewed from a radially outer side. FIG. 22B is a side view of the pad clip when viewed from an axially outer side. FIG. 22C is an end view when viewed from the one side in the circumferential direction.

FIG. 23A shows a braking state when a vehicle travels forward. FIG. 23B shows a braking state when the vehicle travels backward.

DETAILED DESCRIPTION OF EXEMPLIFIED EMBODIMENTS

Figure 1:
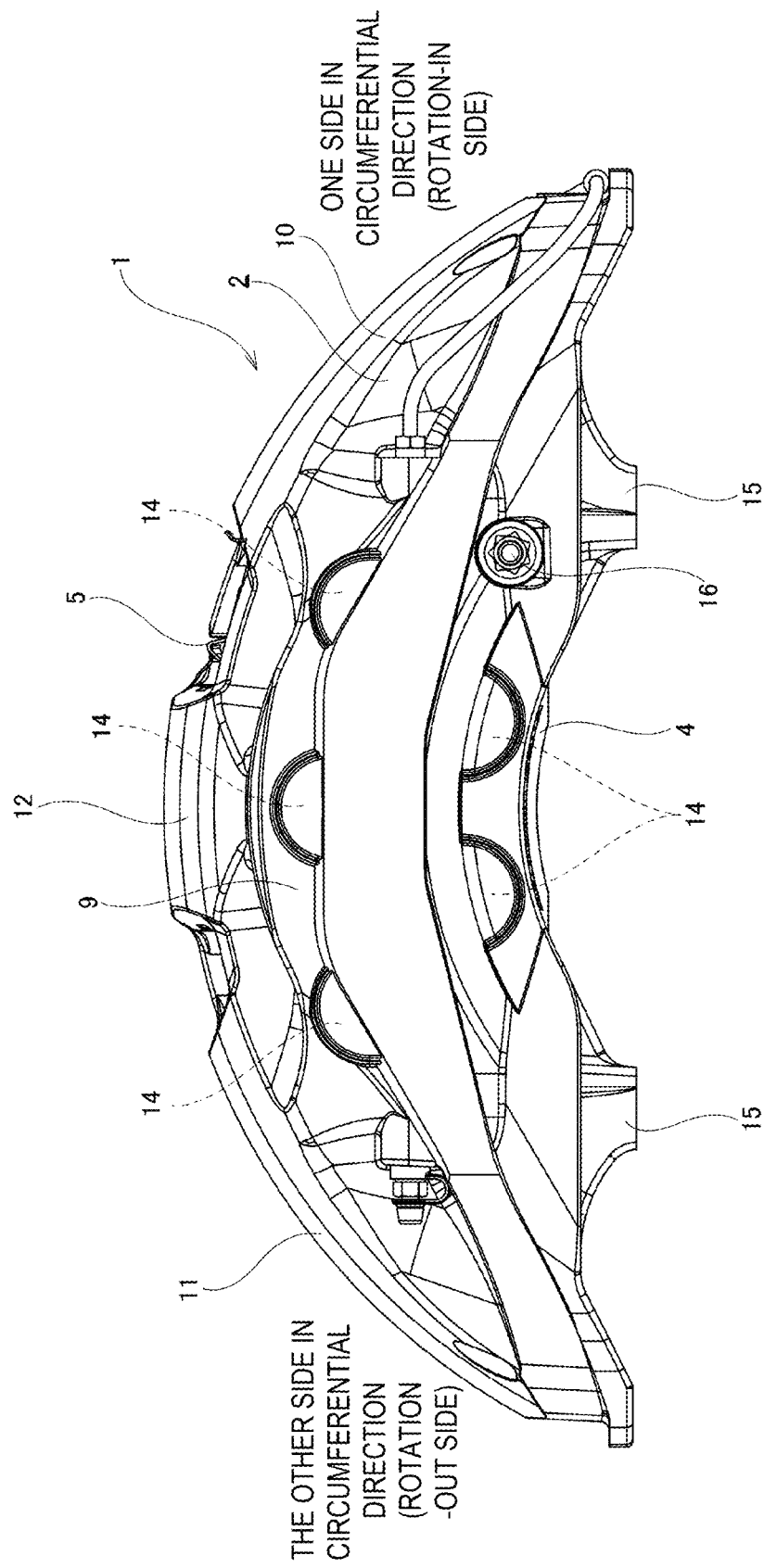
FIG. 1 is a front view showing a disc brake apparatus to which a pad clip according to a first example of an embodiment is attached.

In the pad clip 119 having the related-art structure disclosed in JP-A-2015-90201, the first standing plate portion 127 and the sandwiched plate portions 123a and 123b are provided in the single flat plate, and a magnitude of an interference of the first standing plate portion 127 with respect to a side surface of the rotation-in-side coupling portion 107 on the other side in the circumferential direction and a magnitude of an interference of the sandwiched plate portions 123a and 123b with respect to the torque-receiving surface 117 are the same.

When the inner pad 102 and the outer pad 103 are assembled to the caliper 101, the main body portion 120 that constitutes the pad clip 119 may be bent and deformed such that a radially outer side is convex based on elastic deformation of the rotation-in-side pressing portions 121a and 121b. Therefore, when the first standing plate portion 127 moves away from the rotation-in-side coupling portion 107 toward the other side in the circumferential direction due to the bending deformation of such a pad clip 119, a gap may be generated between the sandwiched plate portions 123a and 123b and the torque-receiving surface 117.

When the gap is generated between the sandwiched plate portions 123a and 123b and the torque-receiving surface 117, a clearance between the torque transmission surface 118 and the sandwiched plate portions 123a and 123b is reduced. As a result, when a braking force is released, a frictional resistance generated between the torque transmission surface 118 and the sandwiched plate portions 123a and 123b may be increased, and a drag torque of the inner pad 102 and the outer pad 103 may be increased.

The present invention has been made to solve the above-described problems, and an objective thereof is to provide a pad clip for a disc brake apparatus and the disc brake apparatus that can prevent generation of a gap between a sandwiched plate portion which constitutes the pad clip and a torque-receiving surface, and that can reduce a drag torque of a pad.

First Example of Embodiment

A first example of an embodiment will be described with reference to FIGS. 1 to 13.

A pad clip 5 of the present example has a structure in which a gap is not easily generated between sandwiched plate portions 28a and 28b and a torque-receiving surface 19 even when a main body portion 26 is bent and deformed.

Hereinafter, before describing the structure of the pad clip 5 of the present example in detail, an overall structure of a disc brake apparatus 1 will be described with reference to FIGS. 1 to 5. Next, a structure of each portion of the pad clip 5 will be described with reference to FIGS. 6 to 13.

Figure 2:
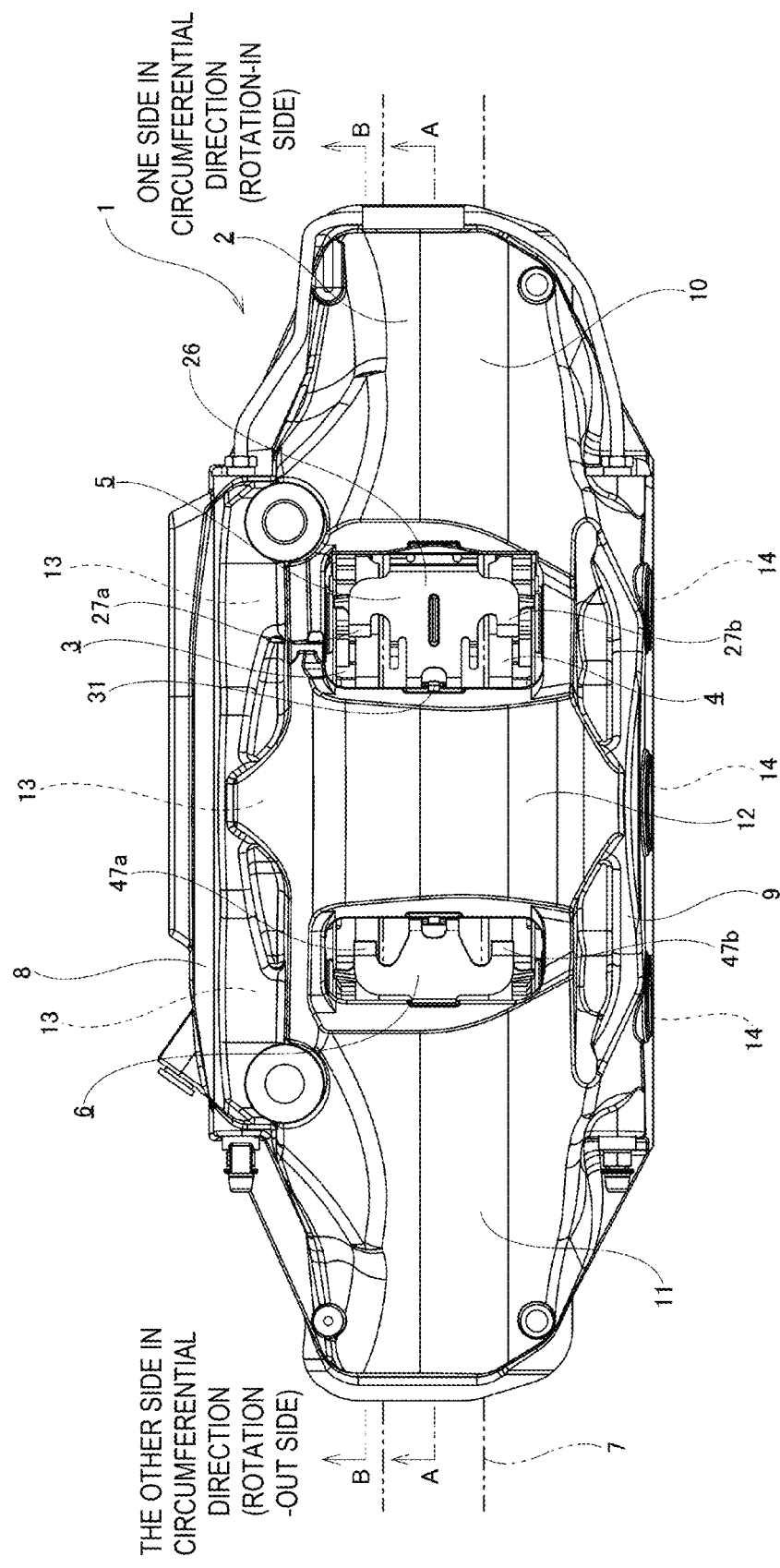
FIG. 2 is a plan view showing the disc brake apparatus to which the pad clip according to the first example of the embodiment is attached.
Figure 3:
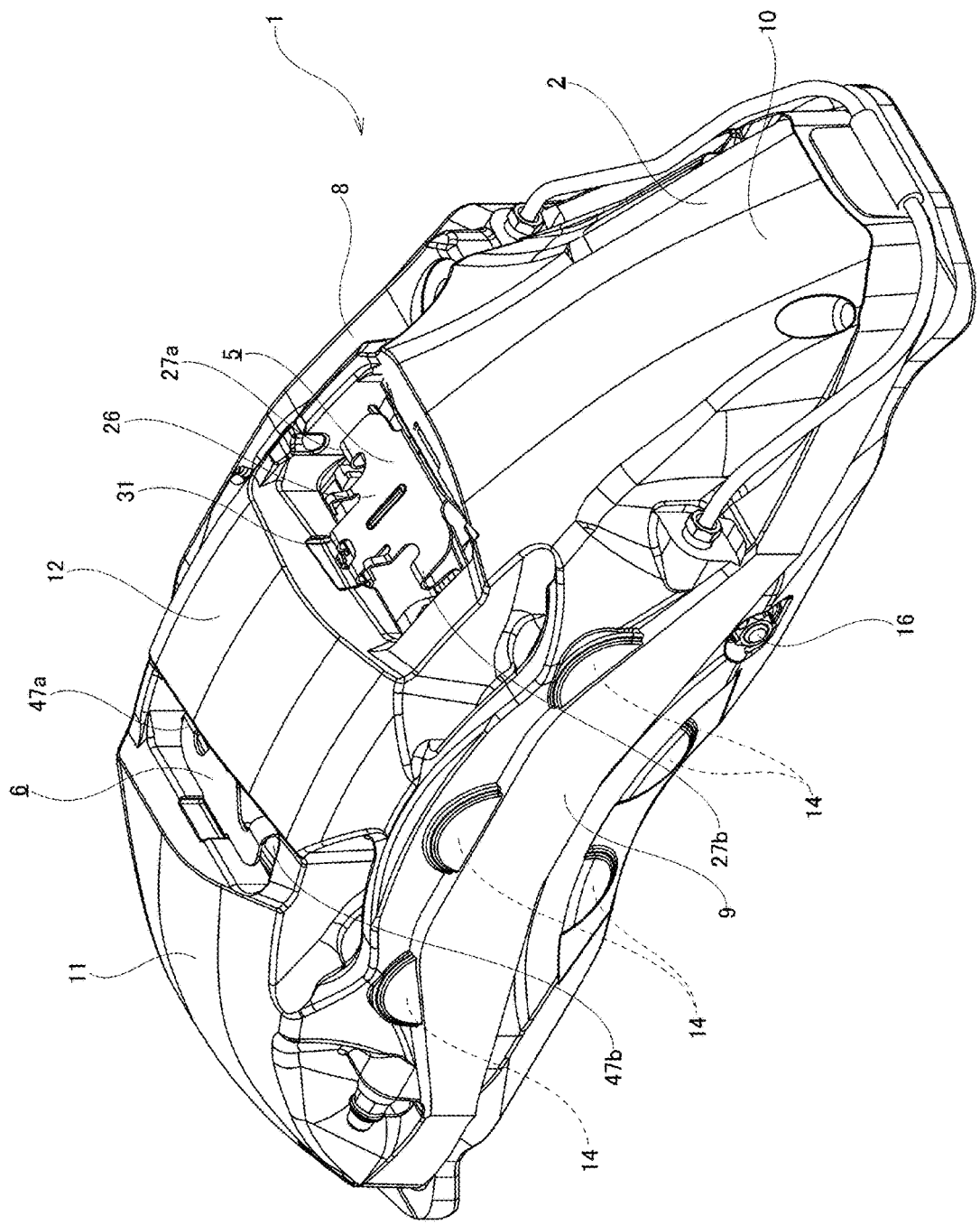
FIG. 3 is a perspective view showing the disc brake apparatus to which the pad clip according to the first example of the embodiment is attached.
Figure 8:
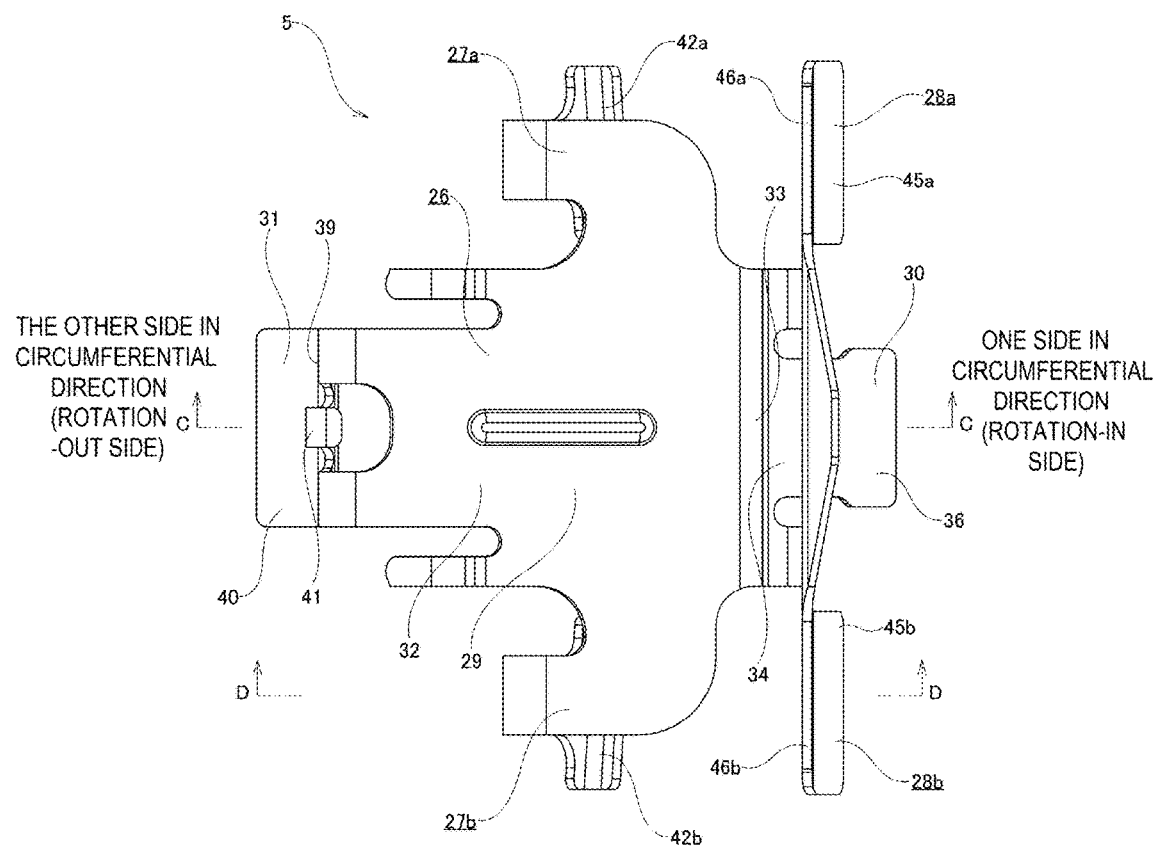
FIG. 8 is a plan view of the pad clip according to the first example of the embodiment when viewed from a radially outer side in which the pad clip is taken out.

In the following description, unless otherwise specified, an axial direction, a circumferential direction, and a radial direction refer to an axial direction, a circumferential direction, and a radial direction of a disc-shaped rotor 7 (see FIG. 2) that rotates together with wheels. A front-back direction of FIGS. 1, 4 to 7, 9, 12, and 13, an upper-lower direction of FIGS. 2 and 8, and a left-right direction of FIG. 10 correspond to the axial direction. A side close to the rotor 7 in the axial direction is referred to as an axially inner side, and a side far from the rotor 7 in the axial direction is referred to as an axially outer side. Further, a left-right direction of FIGS. 1, 2, 4 to 9, 12, and 13, and a front-back direction of FIG. 10 correspond to the circumferential direction. A right side of FIGS. 1, 2, 4 to 9, 12, and 13, and a front side of FIG. 10 are referred to as one sides in a circumferential direction, and a left side of FIGS. 1, 2, 4 to 9, 12, and 13, and a back side of FIG. 10 are referred to as the other sides in the circumferential direction. In the present example, the one side in the circumferential direction is a rotation-in side when a vehicle travels forward and a rotation-out side when the vehicle travels backward, and the other side in the circumferential direction is a rotation-out side when the vehicle travels forward and a rotation-in side when the vehicle travels backward. Further, an upper-lower direction of FIGS. 1, 4 to 7, 9, 10, 12, and 13, and a front-back direction of FIGS. 2 and 8 correspond to the radial direction. An upper side of FIGS. 1, 4 to 7, 9, 10, 12, and 13, and a front side of FIGS. 2 and 8 are radially outer sides, and a lower side of FIGS. 1, 4 to 7, 9, 10, 12, and 13, and a back side of FIGS. 2 and 8 are radially inner sides. The rotation-in side refers to a side on which the rotor 7 enters a caliper 2, and the rotation-out side refers to a side on which the rotor 7 exits from the caliper 2.

Description of Structure of Disc Brake Apparatus

The disc brake apparatus 1 of the present example is a facing piston type disc brake apparatus used to brake an automobile, and includes the caliper 2, a pair of pads 3 and 4 (an inner pad 3 and an outer pad 4), and a pair of pad clips 5 and 6 that elastically press the pair of pads 3 and 4.

(Caliper)

The caliper 2 supports the inner pad 3 and the outer pad 4 so as to be movable in the axial direction, and is integrally molded by subjecting a material made of a light alloy such as an aluminum alloy or an iron-based alloy to casting or the like.

The caliper 2 includes an inner body 8 and an outer body 9 arranged by sandwiching the rotor 7, both rotation-in-side and rotation-out-side coupling portions 10 and 11 that couple end portions of the inner body 8 and the outer body 9 on circumferentially both sides to each other, and an intermediate coupling portion 12 that couples circumferentially intermediate portions of the inner body 8 and the outer body 9 to each other.

<Inner Body and Outer Body>

The inner body 8 includes a plurality of (five in the shown example) inner cylinders 13, and the outer body 9 includes the same number of outer cylinders 14 as that of the inner cylinders 13. An inner piston (not shown) is fitted inside the inner cylinder 13 so as to be displaceable in the axial direction, and an outer piston (not shown) is fitted inside the outer cylinder 14 so as to be displaceable in the axial direction. Such a caliper 2 is supported by and fixed to a knuckle of a suspension device by a pair of attachment seats 15 provided on the inner body 8 in a state of covering the rotor 7 from the radially outer side.

Each of the inner body 8 and the outer body 9 includes a pin 16 at a radially inner portion of a portion on the one side in the circumferential direction. The pair of pins 16 are supported and fixed (fixedly provided) coaxially with each other. Tip end portions of the pair of pins 16 protrude from axially inner surfaces of the inner body 8 and the outer body 9 that face each other, and face axially both side surfaces of the rotor 7 with a gap therebetween. Portions of the pair of pins 16 that protrude from the axially inner surfaces of the inner body 8 and the outer body 9 have a substantially columnar and cylindrical-surface shaped outer peripheral surface shape. During forward braking, such pins 16 are engaged with through holes 23 (described later) provided in the inner pad 3 and the outer pad 4 to support a brake tangential force F1 that acts on the inner pad 3 and the outer pad 4.

The inner body 8 and the outer body 9 include guide wall portions 17 that protrude in the axial direction on axially inner surfaces of a portion on the other side in the circumferential direction that face each other. A radially intermediate portion of the guide wall portion 17 is provided with a guide recessed groove 18 having openings in an axially inner surface and a surface on the one side in the circumferential direction.

<Coupling Portions>

The rotation-in-side coupling portion 10 couples portions on the one side in the circumferential direction of the inner body 8 and the outer body 9 to each other in the axial direction. The rotation-out-side coupling portion 11 couples portions on the other side in the circumferential direction of the inner body 8 and the outer body 9 to each other in the axial direction. The intermediate coupling portion 12 is disposed on a portion between the rotation-in-side coupling portion 10 and the rotation-out-side coupling portion 11 in the circumferential direction, and couples circumferentially intermediate portions of the inner body 8 and the outer body 9 to each other in the axial direction.

The intermediate coupling portion 12 is disposed to be separated from the rotation-in-side coupling portion 10 and the rotation-out-side coupling portion 11 in the circumferential direction. In the present example, the rotation-in-side coupling portion 10 and the intermediate coupling portion 12 correspond to a pair of coupling portions described in the claims.

The rotation-in-side coupling portion 10 includes a pair of flat-surface-shaped torque-receiving surfaces 19 on a side surface on the other side in the circumferential direction that faces the intermediate coupling portion 12 in the circumferential direction. The torque-receiving surface 19 is present on a virtual plane orthogonal to a brake tangential force. During backward braking, the torque-receiving surfaces 19 support a brake tangential force F2 that acts on the inner pad 3 and the outer pad 4 by being abutted against torque transmission surfaces 24 (described later) provided on the inner pad 3 and the outer pad 4.

(Inner Pad and Outer Pad)

Each of the inner pad 3 and the outer pad 4 includes a lining (friction material) 20 and a metal-made back plate (pressure plate) 21 that supports a back surface of the lining 20. In the present example, shapes of end portions on circumferentially both sides of the back plate 21 of each of the inner pad 3 and the outer pad 4 are asymmetrical in the circumferential direction.

Specifically, the back plate 21 includes a protruding portion 22 that protrudes from the lining 20 in the circumferential direction on a radially inner portion of an end portion (rotation-in-side end portion) on the one side in the circumferential direction. The protruding portion 22 includes a substantially rectangular through hole 23 that penetrates in the axial direction in a portion located radially inward of an action line (a friction surface center point A) of a brake tangential force that acts during braking. Further, the back plate 21 includes the flat-surface-shaped torque transmission surface 24 that faces the torque-receiving surface 19 in the circumferential direction on an end portion on a radially outer side of a side surface on the one side in the circumferential direction, the end portion on the radially outer side being located radially outward of the action line of the brake tangential force that acts during braking.

The back plate 21 includes a convex ear portion 25 that protrudes toward the other side in the circumferential direction on a radially intermediate portion of an end portion (rotation-out-side end portion) on the other side in the circumferential direction. During the braking (during the forward braking and during the backward braking), the ear portion 25 supports a moment (rotational force) that acts on the inner pad 3 and the outer pad 4 by abutting a radially inner surface of the ear portion 25 against a radially inner surface of the guide recessed groove 18.

In order to support each of the inner pad 3 and the outer pad 4 so as to be movable in the axial direction with respect to the caliper 2, the pin 16 supported by each of the inner body 8 and the outer body 9 is loosely inserted through the through hole 23 provided in the back plate 21 of each of the inner pad 3 and the outer pad 4 in the axial direction. Further, the ear portions 25 provided in the back plates 21 of the inner pad 3 and the outer pad 4 are engaged with the guide recessed grooves 18 provided in the inner body 8 and the outer body 9 so as to be movable in the axial direction. In the state, the torque transmission surface 24 provided on a side surface of the back plate 21 on the one side in the circumferential direction faces the torque-receiving surface 19 provided on the rotation-in-side coupling portion 10 in the circumferential direction.

(Pad Clips)

The disc brake apparatus 1 of the present example includes the two pad clips 5 and 6.

The pad clip 5 disposed on the one side in the circumferential direction corresponds to a pad clip described in the claims. The pad clip 5 presses portions on the one side in the circumferential direction of outer peripheral edge portions of the back plates 21 of the inner pad 3 and the outer pad 4 radially inward by a pair of rotation-in-side pressing portions 27*a* and 27*b*.

The pad clip 6 disposed on the other side in the circumferential direction presses portions on the other side in the circumferential direction of the outer peripheral edge portions of the back plates 21 of the inner pad 3 and the outer pad 4 radially inward by a pair of rotation-out-side pressing portions 47*a* and 47*b*.

(Moments That Act During Braking)

Figure 23A:
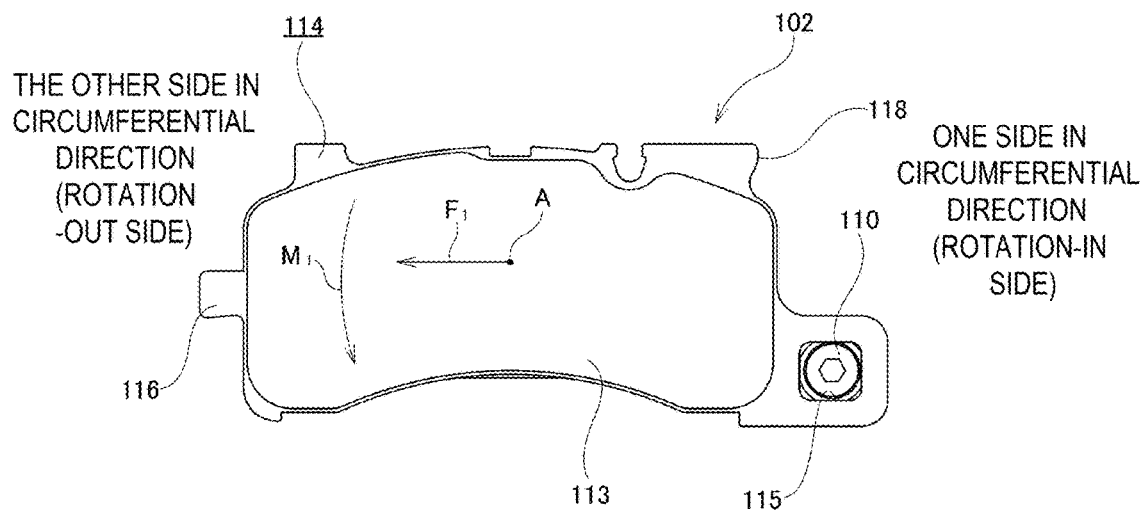
FIGS. 23A and 23B are front views showing an inner pad in which the inner pad is taken out from a disc brake apparatus having a related-art structure.
Figure 23B:
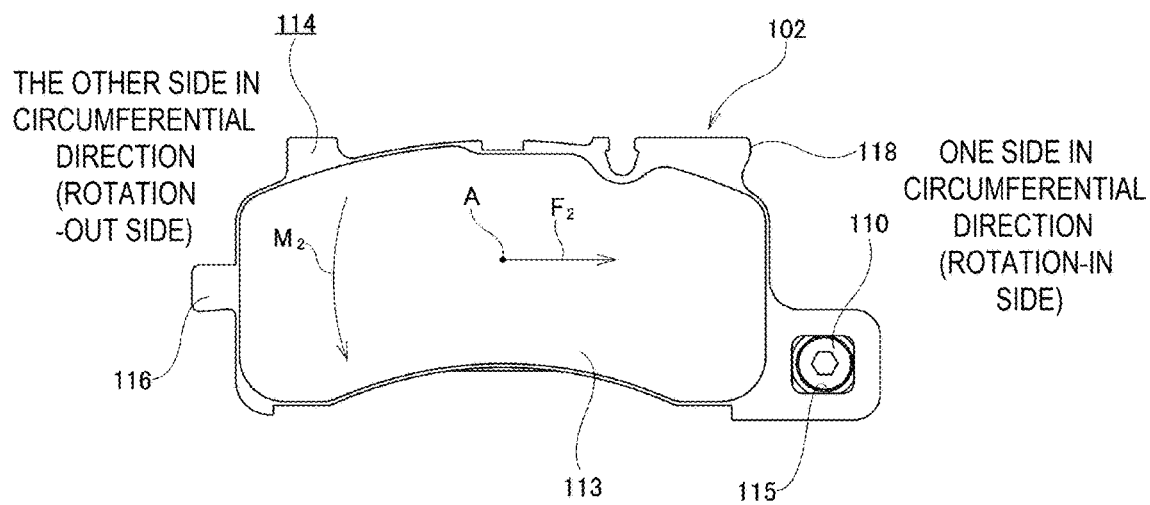

During the braking, the disc brake apparatus 1 of the present example generates a moment similar to that of the structure shown in FIGS. 23A and 23B described above for the inner pad 3 and the outer pad 4.

Figure 4:
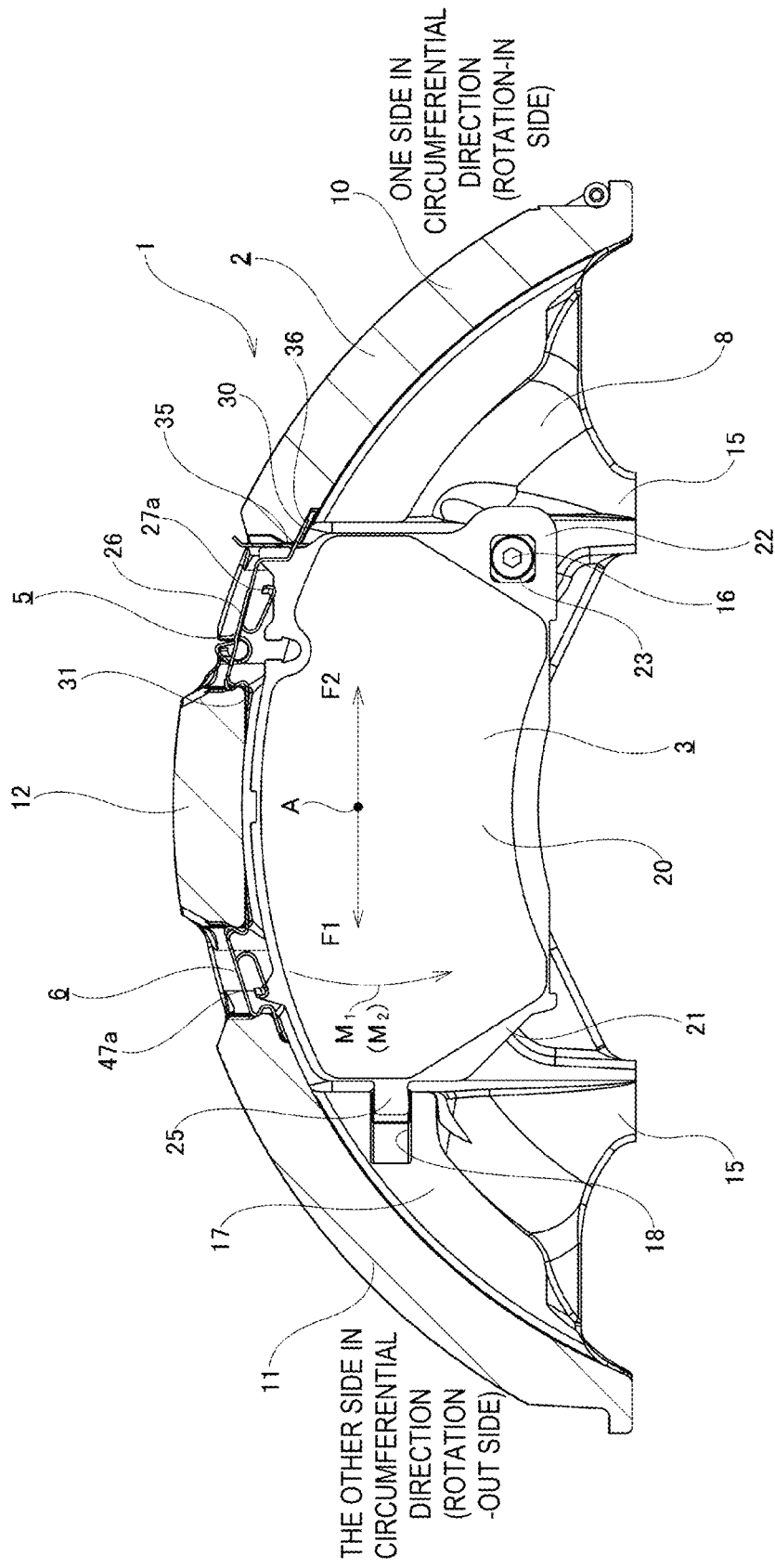
FIG. 4 is a cross-sectional view taken along a line A-A in FIG. 2.
Figure 5:
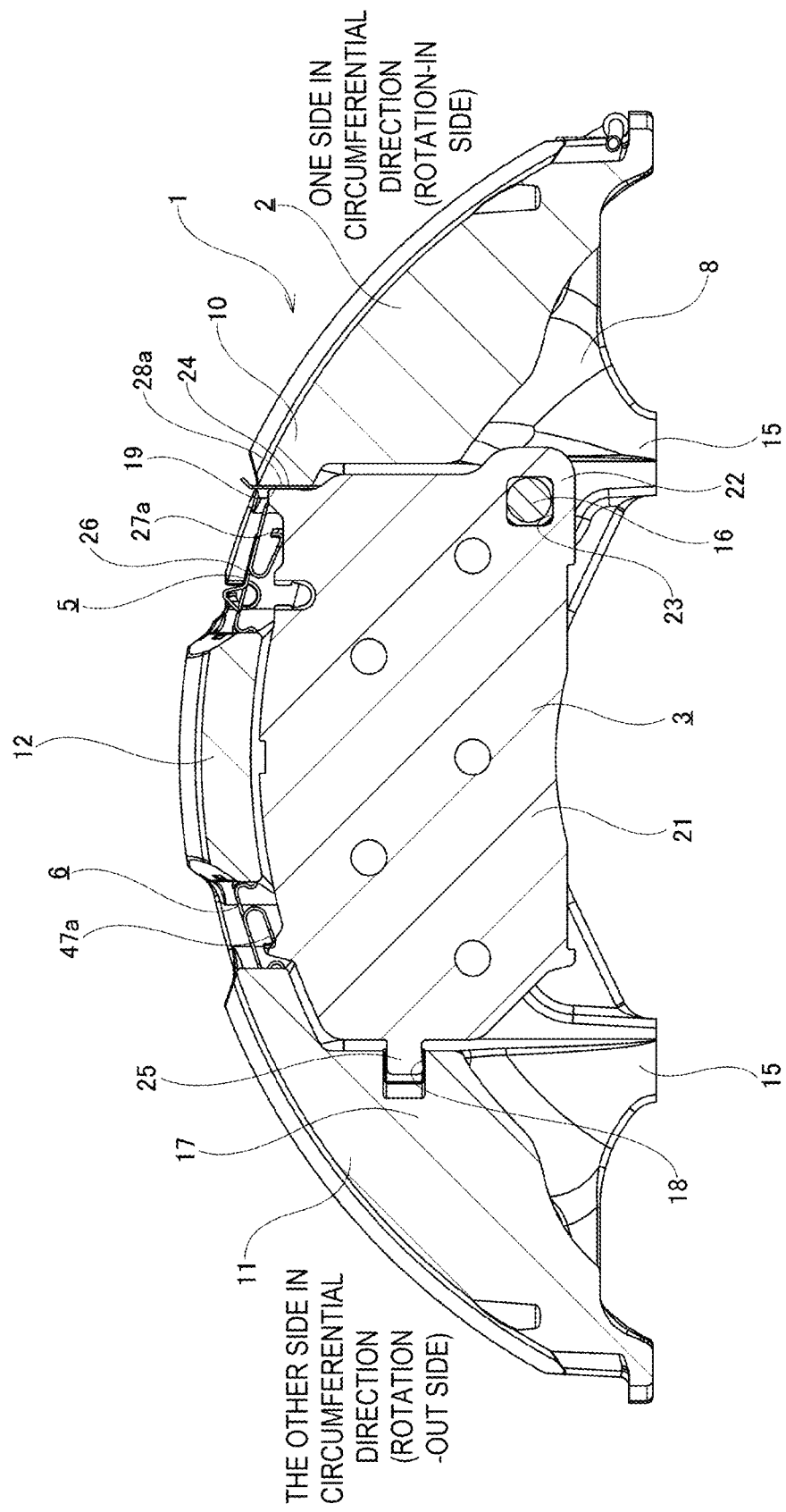
FIG. 5 is a cross-sectional view taken along a line B-B in FIG. 2.

As shown in FIG. 4, during the forward braking, the brake tangential force F1 directed to the other side in the circumferential direction (a left side in FIG. 4, the rotation-out side) acts on the friction surface center point A of the lining 20. Then, the through hole 23 and the pin 16 are engaged with each other to support the brake tangential force F1 (a so-called pull anchor structure is formed). Therefore, during the forward braking, a moment M1 in a direction in which a portion on the other side in the circumferential direction is pushed down toward the radially inner side acts on the inner pad 3 and the outer pad 4. The friction surface center point A is a centroid of a friction surface, and is determined by a diameter, an arrangement, and the like of the piston.

On the contrary, during the backward braking, the brake tangential force F2 directed to the one side in the circumferential direction (a right side in FIG. 4, the rotation-in side) acts on the friction surface center point A of the lining 20. Then, the torque transmission surface 24 is abutted against the torque-receiving surface 19 via the sandwiched plate portions 28*a* and 28*b* (described later) that constitute the pad clip 5 to support the brake tangential force F2 (a so-called push anchor structure is formed). Therefore, during the backward braking, a moment M2 in a direction (the same direction as that of the moment M1) in which the portion on the other side in the circumferential direction is pushed down toward the radially inner side acts on the inner pad 3 and the outer pad 4.

Therefore, according to the disc brake apparatus 1 of the present example, the directions of the moments M1 and M2 that act on the inner pad 3 and the outer pad 4 can be made to coincide with each other during the forward braking and during the backward braking. Therefore, even when the forward braking and the backward braking are repeated, for example, when the vehicle enters a garage, postures of the inner pad 3 and the outer pad 4 can be maintained in a state of being rotated counterclockwise. Therefore, since it is not necessary to change the postures of the inner pad 3 and the outer pad 4, generation of a clonk sound can be prevented.

Detailed Structure of Pad Clip

Hereinafter, a structure of each portion of the pad clip 5 of the present example will be described with reference to FIGS. 6 to 13.

The pad clip 5 is formed by bending a single metal plate having elasticity and corrosion resistance, such as a stainless-steel plate. The pad clip 5 is disposed on a portion between the rotation-in-side coupling portion 10 and the intermediate coupling portion 12 in the circumferential direction.

The pad clip 5 includes the main body portion 26, the pair of rotation-in-side pressing portions 27a and 27b, and the pair of sandwiched plate portions 28a and 28b. The pad clip 5 has a symmetrical shape in the axial direction.
(Main Body Portion)

The main body portion 26 has a function of elastically supporting the pad clip 5 between the rotation-in-side coupling portion 10 and the intermediate coupling portion 12.

Figure 6:
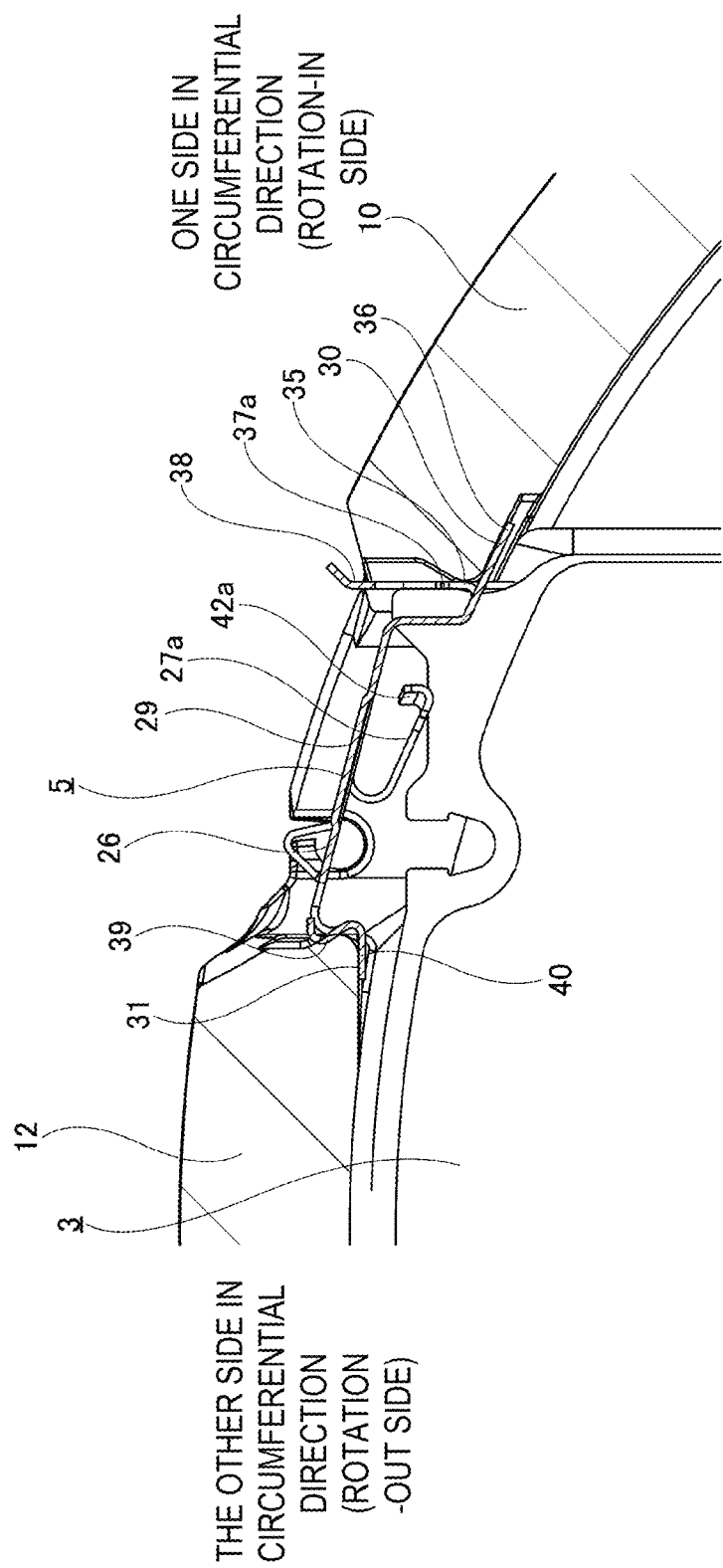
FIG. 6 is a partially enlarged view of FIG. 4.
Figure 7:
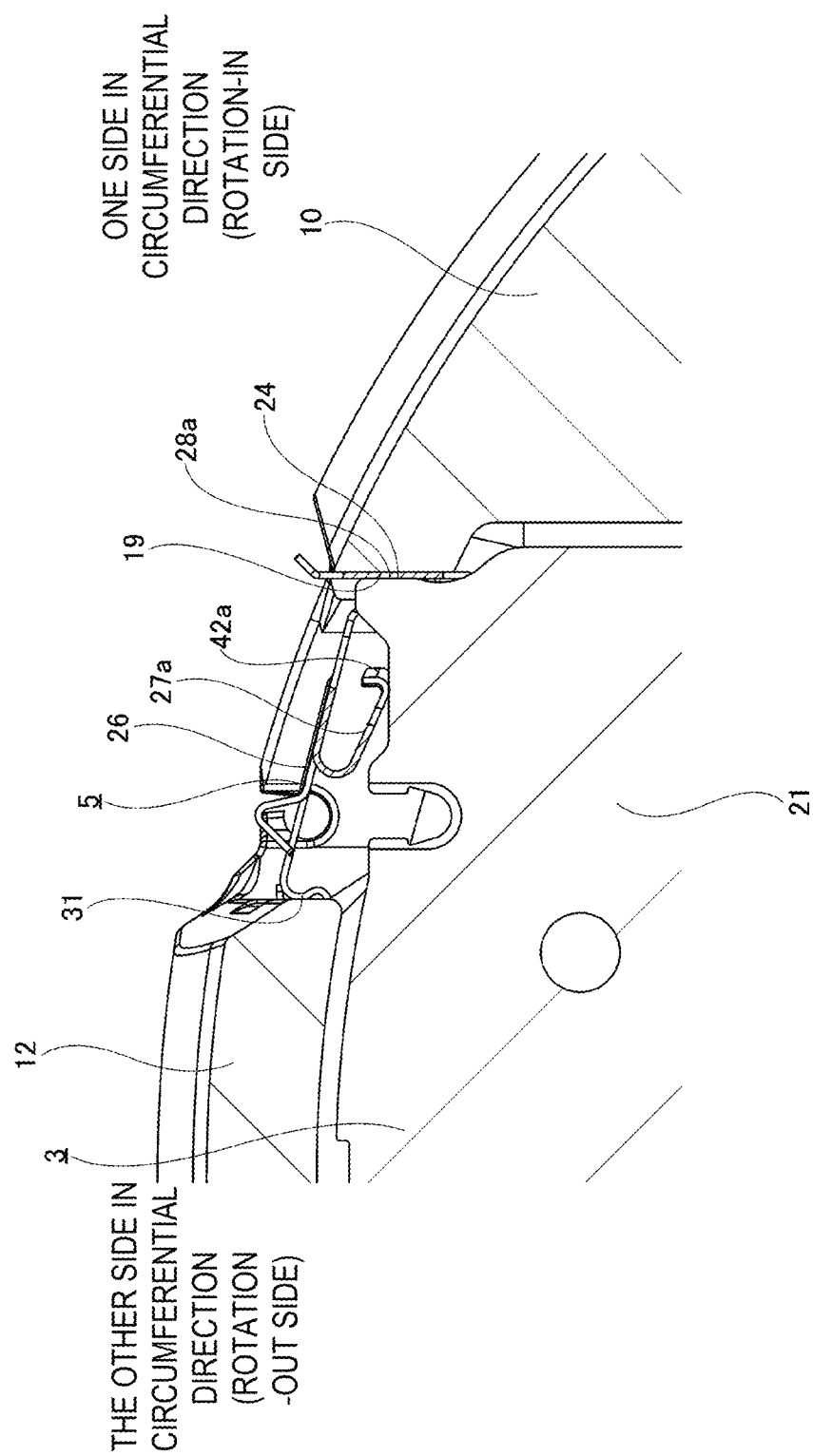
FIG. 7 is a partially enlarged view of FIG. 5.

The main body portion 26 includes a base plate portion 29 disposed on an intermediate portion in the circumferential direction, and a first fixing portion 30 and a second fixing portion 31 arranged on circumferentially both side portions. As shown in FIG. 6, the main body portion 26 is elastically supported by a portion between the rotation-in-side coupling portion 10 and the intermediate coupling portion 12 in the circumferential direction in a state where the first fixing portion 30 is engaged with the rotation-in-side coupling portion 10 and the second fixing portion 31 is engaged with the intermediate coupling portion 12.
<Base Plate Portion>

The base plate portion 29 has a crank shape when viewed in the axial direction, and includes a flat plate portion 32, a hanging plate portion 33 bent radially inward (about 70 degrees in the shown example) from an end portion of the flat plate portion 32 on the one side in the circumferential direction, and a circumferentially extending portion 34 that extends toward the one side in the circumferential direction from an end portion of the hanging plate portion 33 on the radially inner side. The flat plate portion 32 and the circumferentially extending portion 34 are arranged substantially parallel to each other.
<First Fixing Portion>

The first fixing portion 30 is provided on an intermediate portion in the axial direction of an end portion of the main body portion 26 on the one side in the circumferential direction, and is connected to the circumferentially extending portion 34 that constitutes the base plate portion 29. The first fixing portion 30 has a substantially L shape when viewed in the axial direction, and is engaged with a portion on the other side in the circumferential direction of an axially intermediate portion of the rotation-in-side coupling portion 10 as shown in FIG. 6. In an assembled state of the pad clip 5, the first fixing portion 30 elastically presses the rotation-in-side coupling portion 10 toward the one side in the circumferential direction, and elastically presses the rotation-in-side coupling portion 10 toward the radially outer side.

The first fixing portion 30 includes a first standing plate portion 35 and a first push-up plate portion 36.

The first standing plate portion 35 extends so as to be bent radially outward (about 70 degrees in the shown example) from an end portion of the circumferentially extending portion 34 on the one side in the circumferential direction. The first standing plate portion 35 is disposed substantially parallel to the hanging plate portion 33.

The first standing plate portion 35 is in contact with a side surface on the other side in the circumferential direction of the axially intermediate portion of the rotation-in-side coupling portion 10. Therefore, a side surface of the first standing plate portion 35 on the one side in the circumferential direction corresponds to a second contact portion described in the claims. Specifically, the first standing plate portion 35 is in contact with a portion between the pair of torque-receiving surfaces 19 of a side surface of the rotation-in-side coupling portion 10 on the other side in the circumferential direction.

The first standing plate portion 35 has an inverted U shape when viewed in the circumferential direction, and includes a pair of standing pieces 37a and 37b arranged to be separated from each other in the axial direction, and a coupling portion 38 that couples end portions of the pair of standing pieces 37a and 37b on the radially outer side to each other in the axial direction.

The first push-up plate portion 36 is formed by further extending the circumferentially extending portion 34 toward the one side in the circumferential direction. In other words, the first push-up plate portion 36 is formed by bending an inner portion of a substantially U-shaped cut formed in an axially intermediate portion of the first standing plate portion 35 toward the one side in the circumferential direction. The first push-up plate portion 36 is abutted against a radially inner surface of the axially intermediate portion of the rotation-in-side coupling portion 10.
<Second Fixing Portion>

The second fixing portion 31 is provided on an end portion of the main body portion 26 on the other side in the circumferential direction, and is connected to an end portion of the flat plate portion 32 on the other side in the circumferential direction. The second fixing portion 31 has a substantially L shape when viewed in the axial direction, and is engaged with a portion on the one side in the circumferential direction of an axially intermediate portion of the intermediate coupling portion 12 as shown in FIG. 6. The second fixing portion 31 elastically presses the intermediate coupling portion 12 toward the other side in the circumferential direction, and elastically presses the intermediate coupling portion 12 toward the radially outer side.

The second fixing portion 31 includes a second standing plate portion 39 and a second push-up plate portion 40.

The second standing plate portion 39 extends so as to be bent radially inward from the end portion of the flat plate portion 32 on the other side in the circumferential direction. The second standing plate portion 39 is in contact with a side surface on the one side in the circumferential direction of the axially intermediate portion of the intermediate coupling portion 12. Therefore, a side surface of the second standing plate portion 39 on the other side in the circumferential direction corresponds to a first contact portion described in the claims. A radially outer portion of an axially intermediate portion of the second standing plate portion 39 is provided with a bent and raised portion 41 formed by bending and raising the inner portion of the substantially U-shaped cut toward the other side in the circumferential direction. The bent and raised portion 41 elastically presses a side surface of the intermediate coupling portion 12 on the one side in the circumferential direction toward the other side in the circumferential direction.

The second push-up plate portion 40 extends from an end portion of the second standing plate portion 39 on the radially inner side toward the other side in the circumferential direction, and is abutted against a radially inner surface of the axially intermediate portion of the intermediate coupling portion 12.

(Pressing Portions)

The rotation-in-side pressing portions 27a and 27b have a function of stabilizing the postures of the inner pad 3 and the outer pad 4 in a non-braking state by pressing the inner pad 3 and the outer pad 4.

The pair of rotation-in-side pressing portions 27a and 27b are arranged on axially both sides of the base plate portion 29 that constitutes the main body portion 26, and are connected to end portions of the base plate portion 29 on the axially both sides. The rotation-in-side pressing portions 27a and 27b have a lateral U shape when viewed in the axial direction, and are formed by extending from an axially end portion of the base plate portion 29 toward the other side in the circumferential direction, and being folded about 180 degrees toward the radially inner side and the one side in the circumferential direction from respective intermediate portions.

Tip end portions (radially inner end portions) of the rotation-in-side pressing portions 27a and 27b are provided with barb portions 42a and 42b having convex curved surfaces on the radially inner side. An axial width of the barb portions 42a and 42b is larger than an axial width of base end portions to intermediate portions of the rotation-in-side pressing portions 27a and 27b. Further, the barb portions 42a and 42b are inclined in a direction toward the radially inner side as the barb portions 42a and 42b approach each other (approach the rotor 7) in the axial direction.

The rotation-in-side pressing portions 27a and 27b are elastically deformed in the radial direction when the inner pad 3 and the outer pad 4 are assembled. Accordingly, the barb portions 42a and 42b elastically press portions on the one side in the circumferential direction of the outer peripheral edge portions of the back plates 21 of the inner pad 3 and the outer pad 4 radially inward, and elastically press the portions on the one side in the circumferential direction of the outer peripheral edge portions of the back plates 21 of the inner pad 3 and the outer pad 4 axially outward that is a direction away from the rotor 7.

(Sandwiched Plate Portions)

The sandwiched plate portions 28a and 28b are arranged between the torque transmission surface 24 provided on the back plate 21 of each of the inner pad 3 and the outer pad 4 and the torque-receiving surfaces 19 provided on the rotation-in-side coupling portion 10, and have a function of preventing generation of rust between the torque transmission surface 24 and the torque-receiving surface 19.

The sandwiched plate portions 28a and 28b are provided one by one on axially both sides of the first fixing portion 30. In the pad clip 5 of the present example, sandwiched main body portions 45a and 45b (described later) that constitute the sandwiched plate portions 28a and 28b, and the first standing plate portion 35 that constitutes the first fixing portion 30 are not provided in a single flat plate. That is, as in the related-art structure described in JP-A-2015-90201, in a single flat plate, an axially intermediate portion is the first standing plate portion and axially both side portions are not the sandwiched plate portions, and the sandwiched main body portions 45a and 45b that constitute the sandwiched plate portions 28a and 28b and the first standing plate portion 35 are formed by separate flat plates.

For this reason, in the present example, cutout portions (slits) 43a and 43b that extend in the radial direction (the upper-lower direction in FIG. 10) are formed between the sandwiched plate portions 28a and 28b and the first standing plate portion 35 in the axial direction. Accordingly, the sandwiched plate portions 28a and 28b and the first standing plate portion 35 are separated from each other in the axial direction at portions where the cutout portions 43a and 43b are formed, and circumferential positions of the sandwiched plate portions 28a and 28b and the first standing plate portion 35 can be set independently of each other.

The sandwiched plate portions 28a and 28b are connected to the first standing plate portion 35 via low-rigidity connection portions 44a and 44b formed by forming the cutout portions 43a and 43b. Each of the cutout portions 43a and 43b includes an opening end at a radially inner portion and a closed end at a radially outer portion. The closed ends of the cutout portions 43a and 43b are arranged at substantially the same radial positions as a lower side of the coupling portion 38. Therefore, the connection portions 44a and 44b are arranged at substantially the same radial positions as that of the coupling portion 38.

The sandwiched plate portions 28a and 28b have a substantially dogleg shape when viewed in the axial direction, and respectively include the sandwiched main body portions 45a and 45b that have a rectangular flat plate shape and that are arranged on the radially inner side, and auxiliary plate portions 46a and 46b that have a substantially triangular plate shape and that are arranged on the radially outer side. The sandwiched main body portions 45a and 45b are arranged at a portion between the torque transmission surface 24 and the torque-receiving surface 19, whereas the auxiliary plate portions 46a and 46b protrude radially outward from the portion between the torque transmission surface 24 and the torque-receiving surface 19.

Boundaries between the sandwiched main body portions 45a and 45b and the auxiliary plate portions 46a and 46b are arranged at substantially the same radial positions as the closed ends of the cutout portions 43a and 43b. Therefore, the sandwiched main body portions 45a and 45b are separated from the first standing plate portion 35 over an entire width in the radial direction. On one hand, end portions of the auxiliary plate portions 46a and 46b on the axially inner side are connected to the first standing plate portion 35 via the connection portions 44a and 44b. A radial width $W_{44}$ of the connection portions 44a and 44b is about ⅙ to ½ of a radial width $W_{45}$ of the sandwiched main body portions 45a and 45b.

In the pad clip 5 of the present example, since the sandwiched main body portions 45a and 45b are separated from the first standing plate portion 35 over an entire width in the radial direction, circumferential positions of the sandwiched main body portions 45a and 45b can be set independently of a circumferential position of the first standing plate portion 35.

Therefore, in a free state of the pad clip 5, a circumferential dimension X from the side surface (first contact portion) of the second standing plate portion 39 on the other side in the circumferential direction in contact with the side surface of the intermediate coupling portion 12 on the one side in the circumferential direction to side surfaces of the sandwiched main body portions 45a and 45b on the one side in the circumferential direction in contact with the torque-receiving surface 19 can be set independently of a circumferential dimension Y from the side surface of the second standing plate portion 39 on the other side in the circumferential direction to the side surface (second contact portion) of the first standing plate portion 35 on the one side in the circumferential direction in contact with the side surface of the rotation-in-side coupling portion 10 on the other side in the circumferential direction.

In other words, a magnitude of an interference of the first standing plate portion 35 (second contact portion) with respect to the rotation-in-side coupling portion 10 and a magnitude of an interference of the sandwiched main body portions 45a and 45b with respect to the torque-receiving surface 19 can be set separately.

In the pad clip 5 of the present example, the first standing plate portion 35 and the second standing plate portion 39 are stretched in the circumferential direction between the rotation-in-side coupling portion 10 and the intermediate coupling portion 12, and the rotation-in-side pressing portions 27a and 27b, the first push-up plate portion 36, and the second push-up plate portion 40 are stretched in the radial direction between the inner pad 3 and the outer pad 4 and between the rotation-in-side coupling portion 10 and the intermediate coupling portion 12, so that the pad clip 5 is elastically supported by the disc brake apparatus 1. Then, in such an attached state, the rotation-in-side pressing portions 27a and 27b are elastically deformed in the radial direction, so that the main body portion 26 tends to be bent and deformed such that a radially outer side is convex. Therefore, the side surface of the first standing plate portion 35 on the one side in the circumferential direction tends to be away (float) from the side surface of the rotation-in-side coupling portion 10 on the other side in the circumferential direction toward the other side in the circumferential direction.

Therefore, in the present example, even when the main body portion 26 is bent and deformed based on the elastic deformation of the rotation-in-side pressing portions 27a and 27b and the side surface of the first standing plate portion 35 on the one side in the circumferential direction is separated in the circumferential direction from the side surface of the rotation-in-side coupling portion 10 on the other side in the circumferential direction, the circumferential dimension X is regulated such that the side surfaces of the sandwiched main body portions 45a and 45b are in surface contact with the torque-receiving surface 19. In other words, the circumferential dimension X is regulated such that a value of the interference of the sandwiched main body portions 45a and 45b is not positive (no gap is generated between the sandwiched main body portions 45a and 45b and the torque-receiving surface 19) regardless of the bending deformation generated in the main body portion 26.

Figure 9:
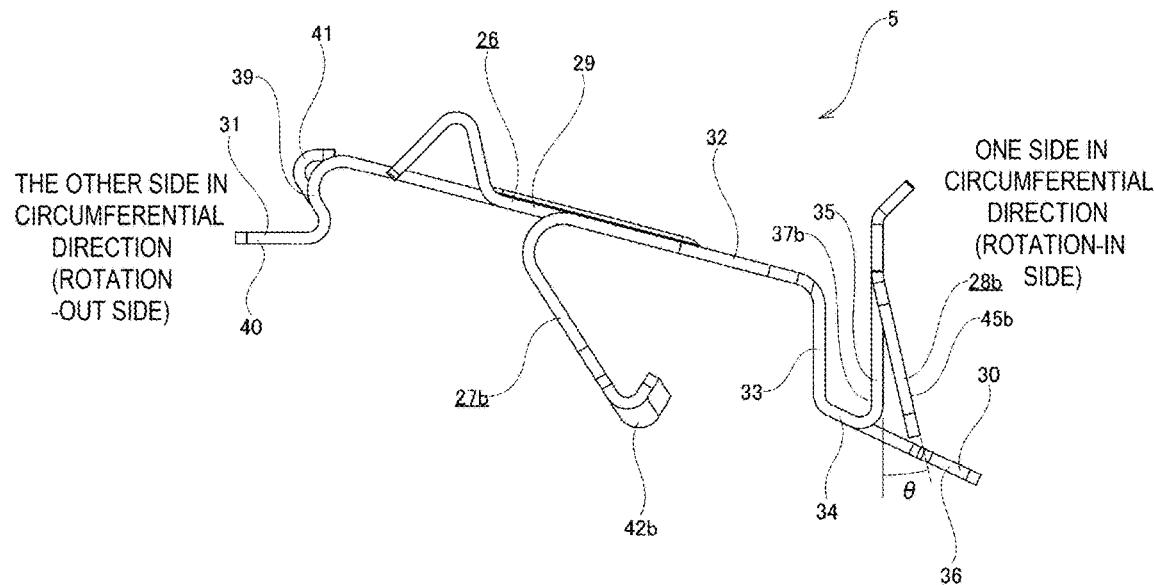
FIG. 9 is a side view of the pad clip according to the first example of the embodiment when viewed from an axially outer side in which the pad clip is taken out.
Figure 10:
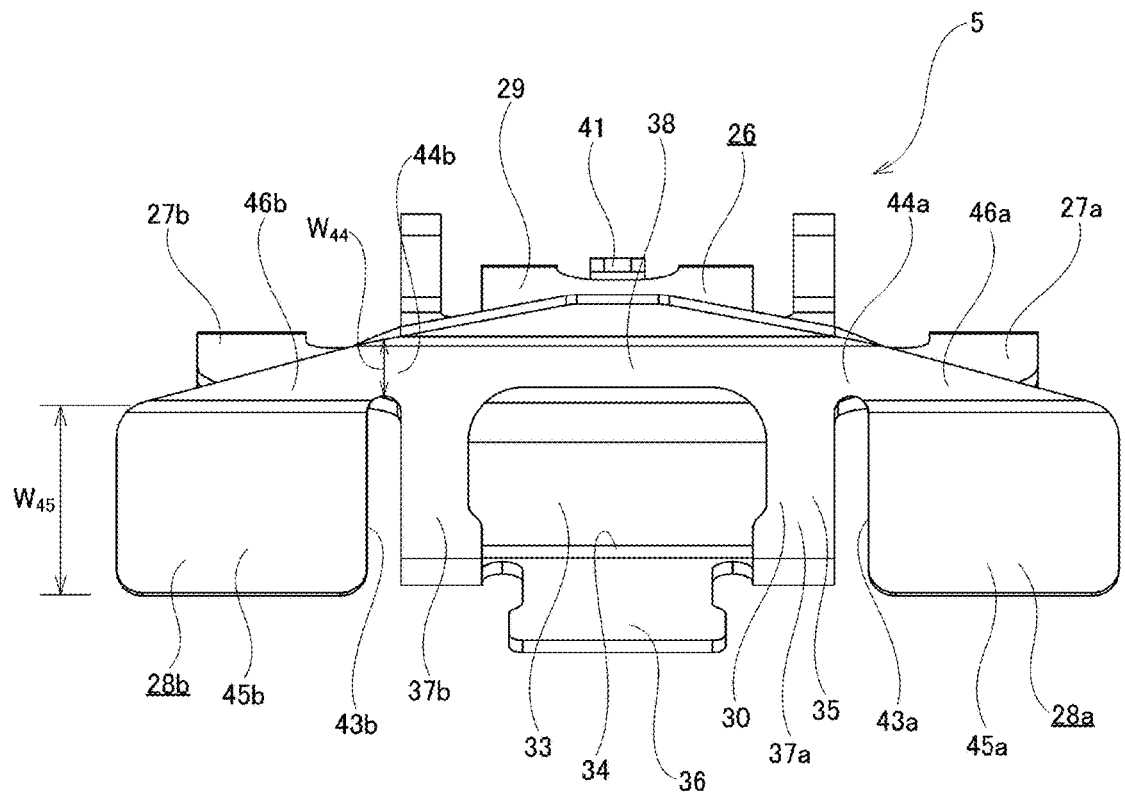
FIG. 10 is an end view of the pad clip according to the first example of the embodiment when viewed from one side in a circumferential direction in which the pad clip is taken out.
Figure 11:
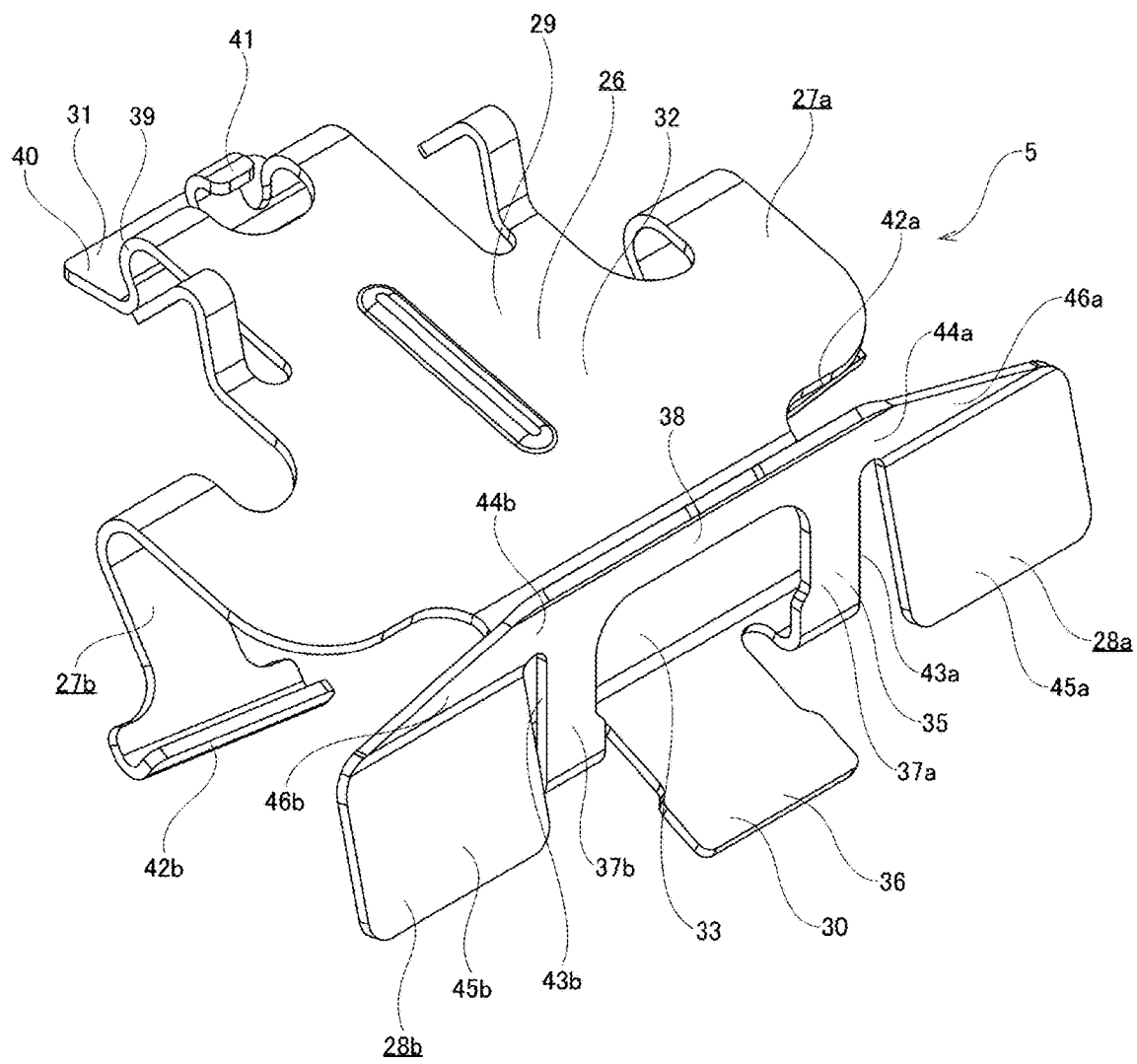
FIG. 11 is a perspective view of the pad clip according to the first example of the embodiment when viewed from the radially outer side and the one side in the circumferential direction in which the pad clip is taken out.
Figure 12:
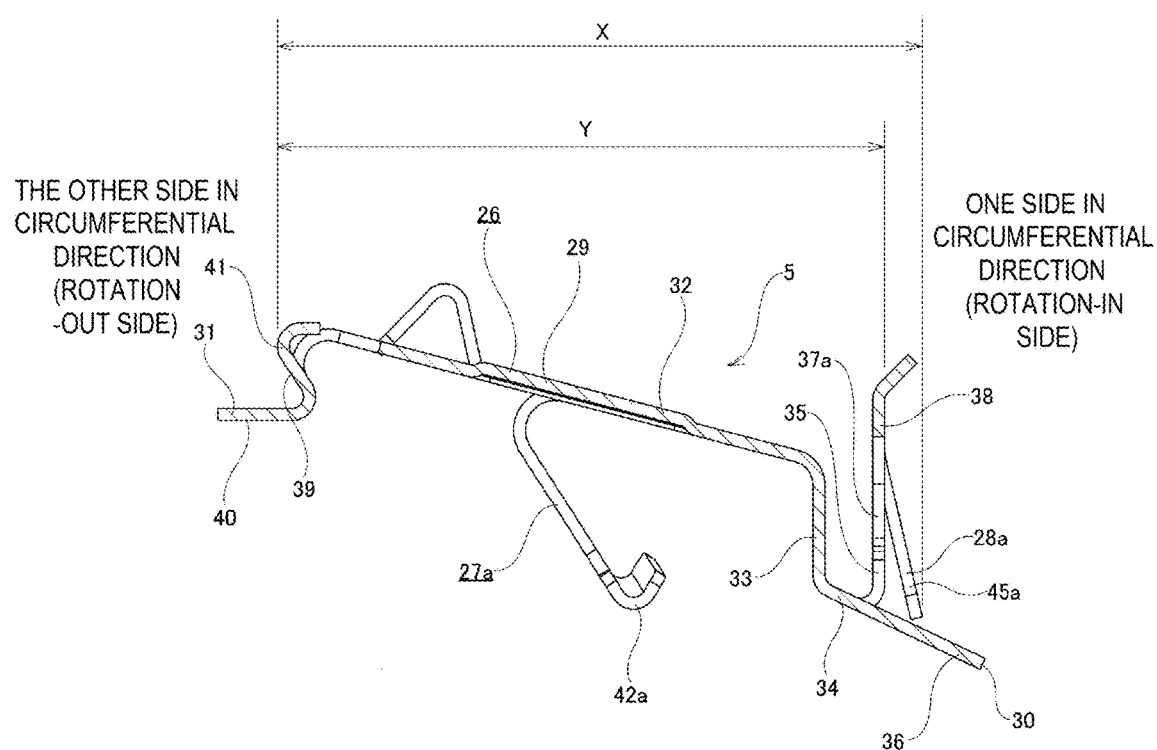
FIG. 12 is a cross-sectional view taken along a line C-C in FIG. 8.
Figure 13:
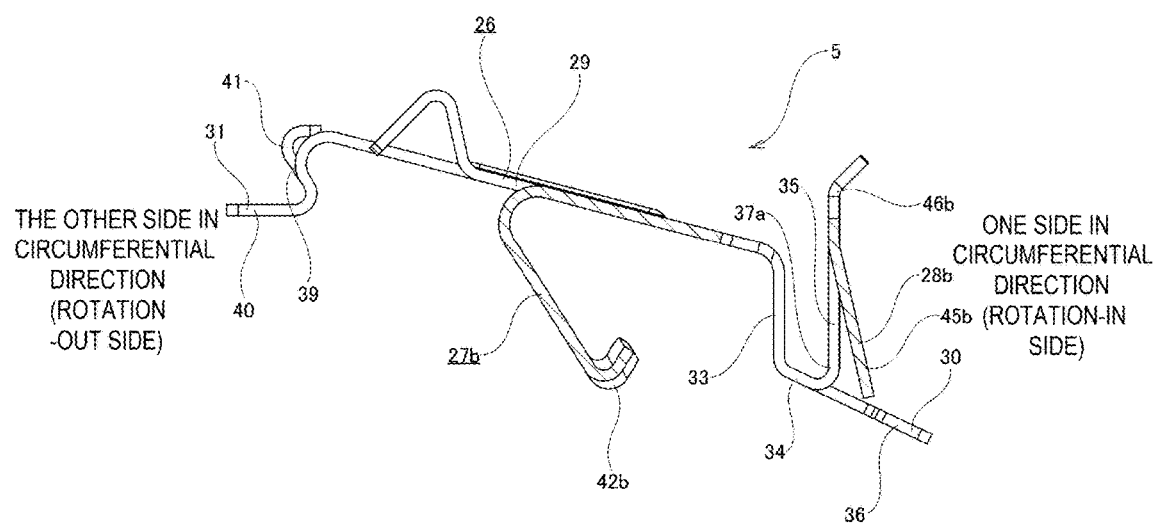
FIG. 13 is a cross-sectional view taken along a line D-D in FIG. 8.
Figure 14:
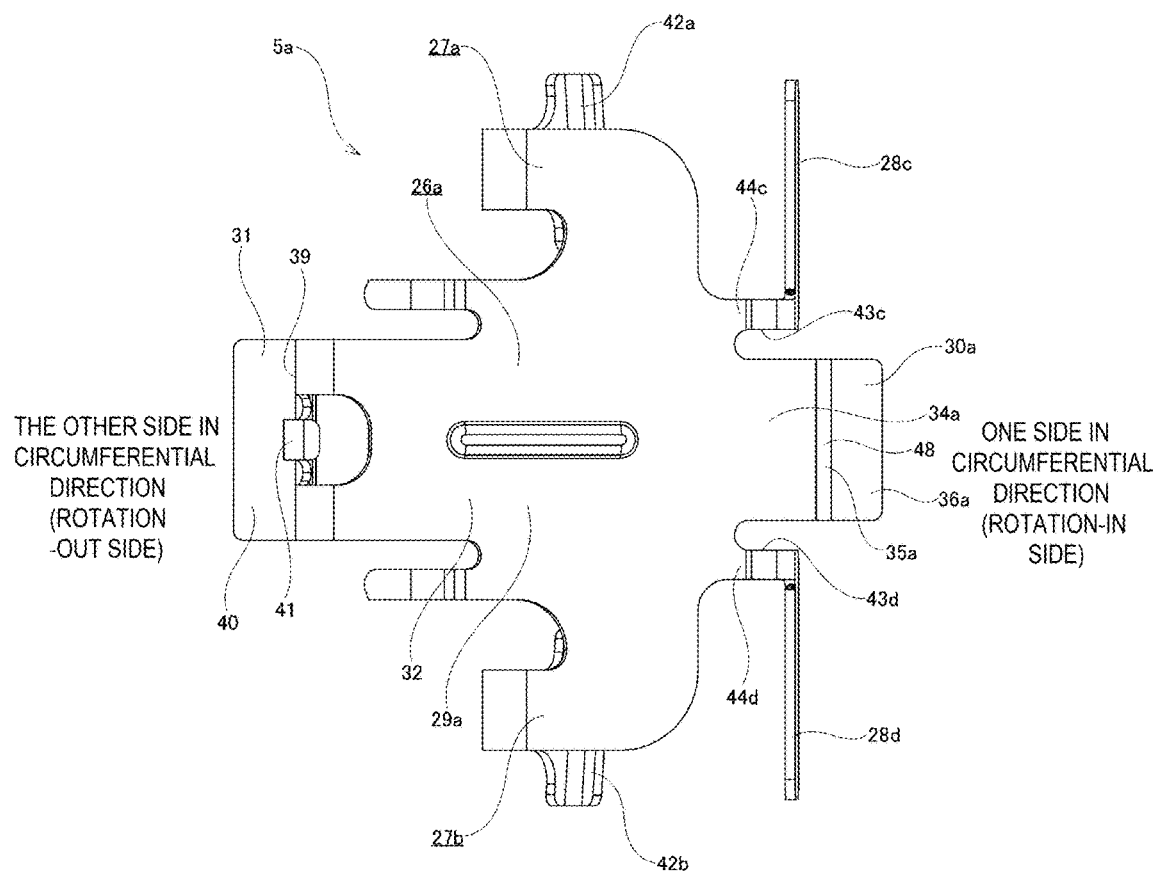
FIG. 14 is a view that shows a second example of the embodiment and corresponds to FIG. 8.
Figure 15:
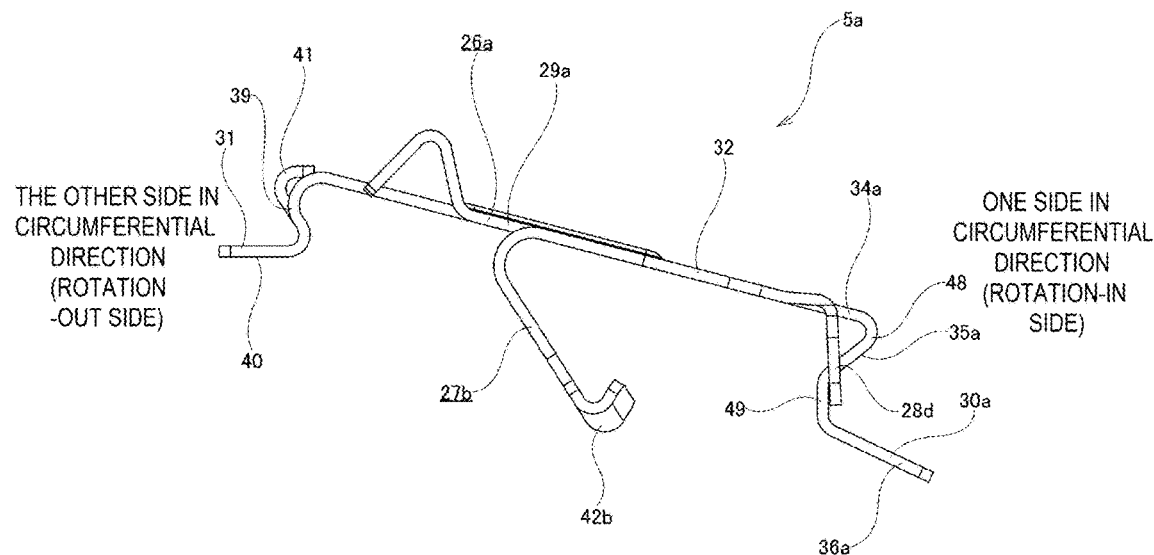
FIG. 15 is a view that shows the second example of the embodiment and corresponds to FIG. 9.
Figure 16:
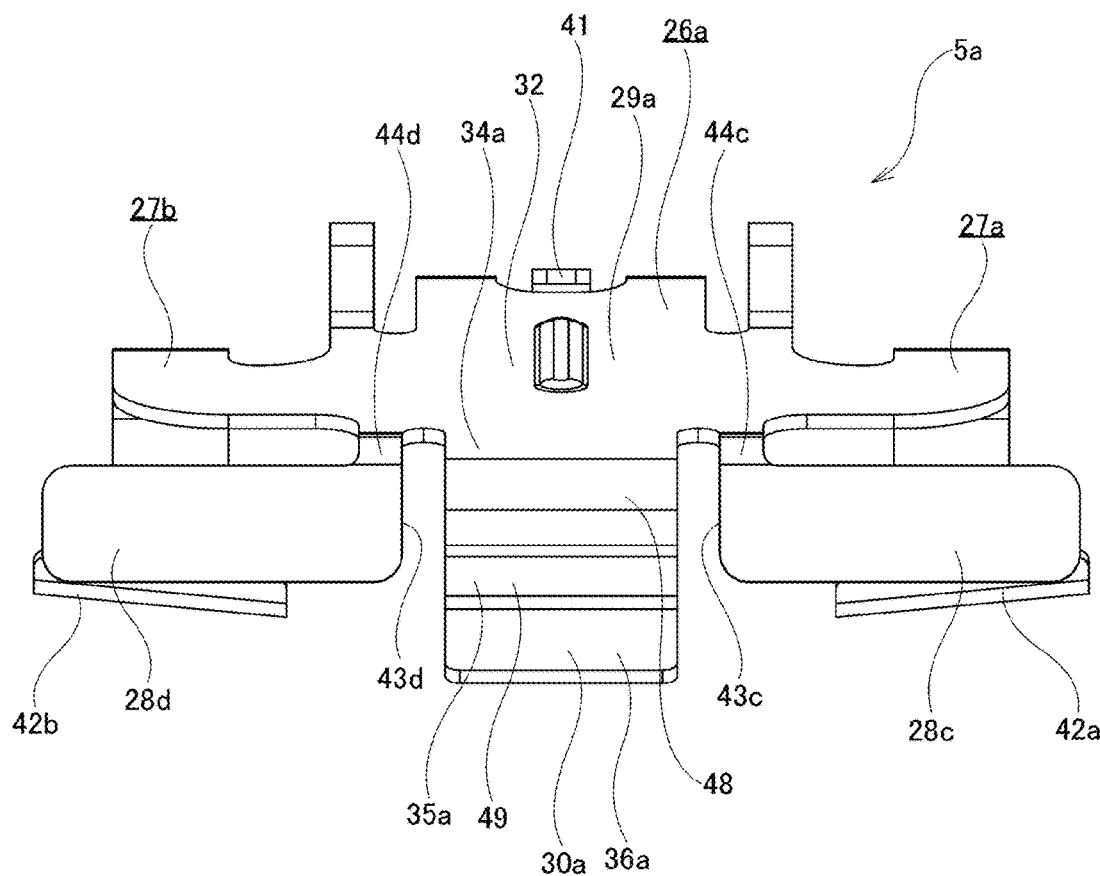
FIG. 16 is a view that shows the second example of the embodiment and corresponds to FIG. 10.
Figure 17:
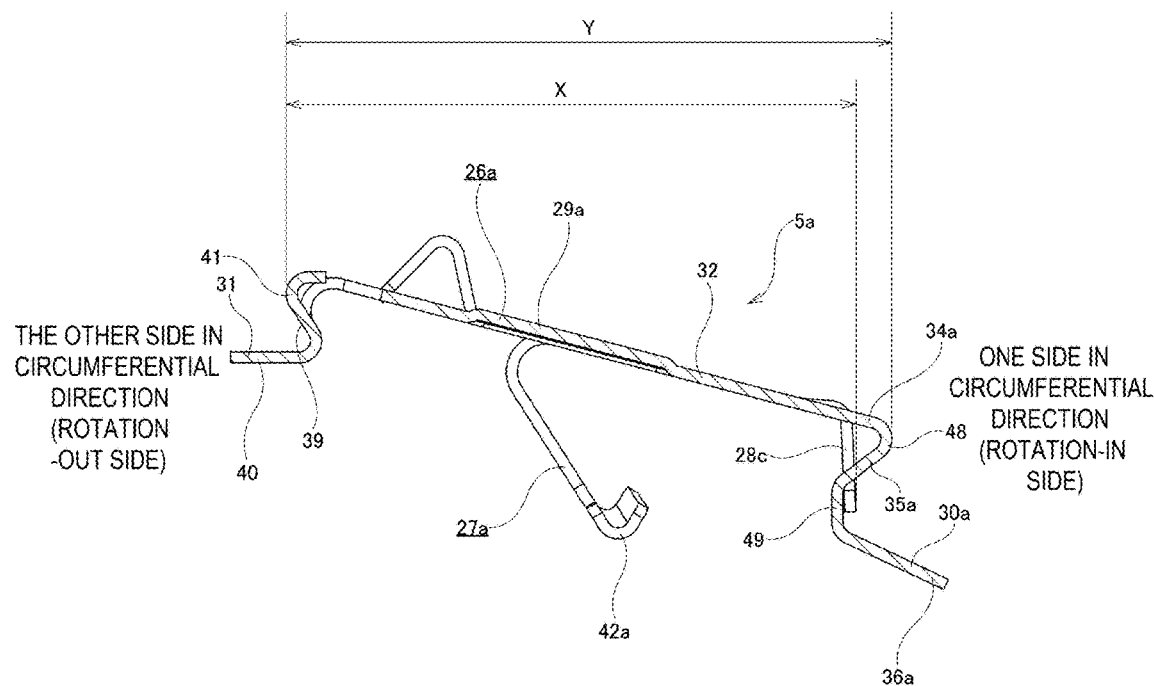
FIG. 17 is a view that shows the second example of the embodiment and corresponds to FIG. 12.
Figure 18:
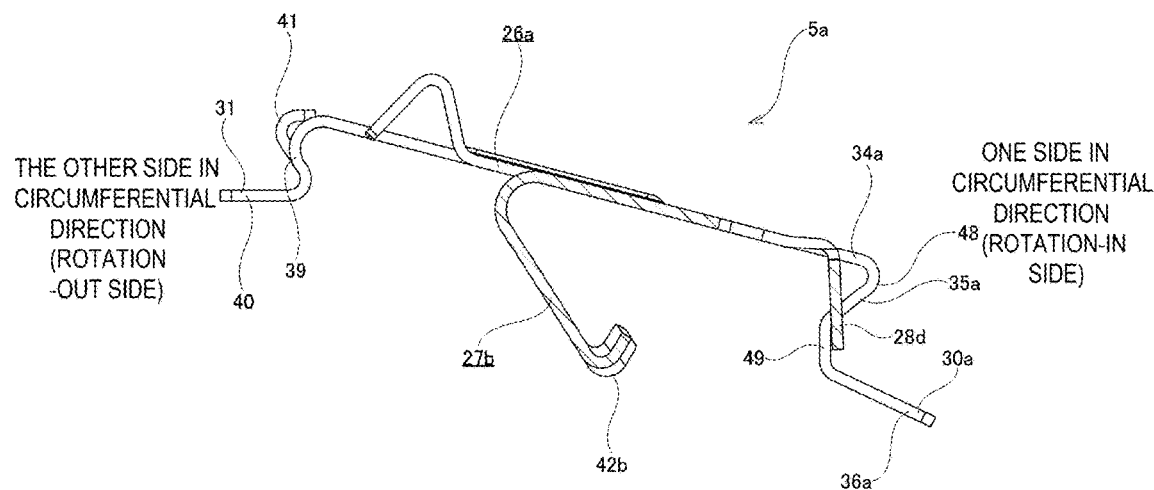
FIG. 18 is a view that shows the second example of the embodiment and corresponds to FIG. 13.

For this reason, in the present example, as shown in FIGS. 9 and 12, in the free state of the pad clip 5, the sandwiched main body portions 45a and 45b are inclined in a direction toward the one side in the circumferential direction as the sandwiched main body portions 45a and 45b are separated from the connection portions 44a and 44b in the radial direction, that is, as the sandwiched main body portions 45a and 45b extend toward the radially inner side. An inclination angle θ of the sandwiched main body portions 45a and 45b with respect to the side surface of the first standing plate portion 35 on the one side in the circumferential direction is larger than 0 degrees and equal to or smaller than 20 degrees, and is 15 degrees in the shown example.

Then, since the sandwiched main body portions 45a and 45b are inclined in a direction toward the one side in the circumferential direction as the sandwiched main body portions 45a and 45b extend toward the radially inner side, the interference of the sandwiched main body portions 45a and 45b with respect to the torque-receiving surface 19 is larger than the interference of the first standing plate portion 35 with respect to the side surface of the rotation-in-side coupling portion 10 on the other side in the circumferential direction. In the shown example, the side surfaces of the sandwiched main body portions 45a and 45b on the one side in the circumferential direction are located more closer to the one side in the circumferential direction than the side surface of the first standing plate portion 35 on the one side in the circumferential direction, and the circumferential dimension X is larger than the circumferential dimension Y.

In the pad clip 5 of the present example, the side surfaces of the sandwiched main body portions 45a and 45b on the one side in the circumferential direction can be in surface contact with the torque-receiving surface 19 with interference in both the braking state and the non-braking state. The side surfaces of the sandwiched main body portions 45a and 45b on the other side in the circumferential direction face the torque transmission surfaces 24 provided on the back plates 21 of the inner pad 3 and the outer pad 4 in the circumferential direction. The side surfaces of the sandwiched main body portions 45a and 45b on the other side in the circumferential direction are in contact with the torque transmission surface 24 only during the backward braking, and a gap is provided between the side surfaces and the torque transmission surface 24 in a state other than the time of the backward braking.

When the present invention is carried out, entirety of the sandwiched plate portions 28a and 28b can be inclined in a direction toward the one side in the circumferential direction as the sandwiched plate portions 28a and 28b are away from the connection portions 44a and 44b in the radial direction, or the entirety or a part of the sandwiched plate portions 28a and 28b can be inclined in a direction toward the one side in the circumferential direction as the sandwiched plate portions 28a and 28b are away from the connection portions 44a and 44b in the axial direction (toward the axially outer side).

According to the pad clip 5 of the present example as described above, generation of a gap between the sandwiched plate portions 28a and 28b and the torque-receiving surface 19 can be prevented, and a drag torque of the inner pad 3 and the outer pad 4 can be reduced.

That is, in the pad clip 5 of the present example, the cutout portions 43a and 43b are formed between the sandwiched plate portions 28a and 28b and the first standing plate portion 35, and the sandwiched main body portions 45a and 45b and the first standing plate portion 35 are separated from each other. Therefore, the circumferential dimension X from the side surface of the second standing plate portion 39 on the other side in the circumferential direction to the side surfaces of the sandwiched main body portions 45a and 45b on the one side in the circumferential direction can be set independently of the circumferential dimension Y from the side surface of the second standing plate portion 39 on the other side in the circumferential direction to the side surface of the first standing plate portion 35 on the one side in the circumferential direction. Then, in the present example, the circumferential dimension X is set such that the interference of the sandwiched main body portions 45a and 45b with respect to the torque-receiving surface 19 is larger than the interference of the first standing plate portion 35 with respect to the side surface of the rotation-in-side coupling portion 10 on the other side in the circumferential direction.

Therefore, the side surfaces of the sandwiched main body portions 45a and 45b on the one side in the circumferential direction can be in surface contact with the torque-receiving surface 19 regardless of the bending deformation generated in the main body portion 26 based on the elastic deformation of the rotation-in-side pressing portions 27a and 27b.

Therefore, according to the pad clip 5 of the present example, the gap can be prevented from being generated between the sandwiched plate portions 28a and 28b and the torque-receiving surface 19. Therefore, it is possible to sufficiently secure a clearance between the torque transmission surfaces 24 of the inner pad 3 and the outer pad 4 and the sandwiched plate portions 28a and 28b in a state where a braking force is released. As a result, a frictional resistance generated between the torque transmission surfaces 24 and the sandwiched plate portions 28a and 28b can be reduced, and the drag torque of the inner pad 3 and the outer pad 4 can be reduced.

The sandwiched main body portions 45a and 45b are inclined in the direction toward the one side in the circumferential direction as the sandwiched main body portions 45a and 45b extend toward the radially inner side. Therefore, since the sandwiched main body portions 45a and 45b can be in contact with the torque-receiving surface 19 with the interference, even when the circumferential positions of the sandwiched plate portions 28a and 28b are displaced, the sandwiched main body portions 45a and 45b can be in surface contact with the torque-receiving surface 19 effectively.

The rotation-in-side pressing portions 27a and 27b (barb portions 42a and 42b) apply elastic forces in directions away from each other in the axial direction to the inner pad 3 and the outer pad 4. Therefore, the linings 20 of the inner pad 3 and the outer pad 4 can be separated from the rotor 7 during non-braking. Therefore, also from this perspective, dragging of the inner pad 3 and the outer pad 4 can be prevented, and generation of judder can be prevented.

Second Example of Embodiment

A second example of the embodiment will be described with reference to FIGS. 14 to 18.

In the present example, a structure of a main body portion 26a and a pair of sandwiched plate portions 28c and 28d that constitute a pad clip 5a is changed from the structure of the first example of the embodiment.

That is, a base plate portion 29a that constitutes the main body portion 26a includes a flat plate portion 32 and a circumferentially extending portion 34a that extends in a circumferential direction from an axially intermediate portion of an end portion of the flat plate portion 32 on the one side in the circumferential direction.

A first fixing portion 30a that constitutes the main body portion 26a has a substantially L shape when viewed in the axial direction, and includes a first standing plate portion 35a and a first push-up plate portion 36a. The first standing plate portion 35a and the first push-up plate portion 36a have the same axial dimension.

The first standing plate portion 35a extends so as to be bent radially inward from an end portion of the circumferentially extending portion 34a, which constitutes the base plate portion 29a, on the one side in the circumferential direction. The first standing plate portion 35a includes a bent portion 48 on a radially outer portion, and includes a flat plate portion 49 on a radially inner portion. The bent portion 48 has a lateral U shape when viewed in the axial direction, and an end portion of the bent portion 48 on the one side in the circumferential direction is in contact with a side surface of an axially intermediate portion of the rotation-in-side coupling portion 10 on the other side in the circumferential direction.

The first push-up plate portion 36a extends from an end portion of the flat plate portion 49, which constitutes the first standing plate portion 35a, on a radially inner side toward the one side in the circumferential direction, and is abutted against a radially inner surface of the axially intermediate portion of the rotation-in-side coupling portion 10.

The sandwiched plate portions 28c and 28d are provided one by one on axially both sides of the first fixing portion 30a. Cutout portions (slits) 43c and 43d that extend in a radial direction (an upper-lower direction in FIG. 16) are formed between the sandwiched plate portions 28c and 28d and the first fixing portion 30a (first standing plate portion 35a) in the axial direction. Therefore, the sandwiched plate portions 28c and 28d and the first fixing portion 30a are separated from each other in the axial direction at portions where the cutout portions 43c and 43d are formed. The cutout portions 43c and 43d of the present example have a substantially L shape, extend from end portions on a radially outer side toward the other side in the circumferential direction, and include closed ends on end portions on the other side in the circumferential direction.

The sandwiched plate portions 28c and 28d are connected to end portions on axially both sides of an end portion of the flat plate portion 32 on the one side in the circumferential direction via connection portions 44c and 44d that have low rigidity and that are formed by forming the cutout portions 43c and 43d. The connection portions 44c and 44d are arranged on axially both sides of the circumferentially extending portion 34a, and extend in the circumferential direction.

The sandwiched plate portions 28c and 28d are arranged in a rectangular flat plate shape, and end portions on a radially outer side of end portions on the axially inner side are connected to end portions of the connection portions 44c and 44d on the one side in the circumferential direction. The sandwiched plate portions 28c and 28d are arranged so as to be bent at a substantially right angle from the end portions of the connection portions 44c and 44d on the one side in the circumferential direction radially inward. In the present example, the sandwiched plate portions 28c and 28d are arranged substantially parallel to the flat plate portion 49 that constitutes the first fixing portion 30a. In the shown example, the sandwiched plate portions 28c and 28d are inclined with respect to the flat plate portion 49 by about several degrees (1 to 3 degrees) in a direction toward the one side in the circumferential direction as the sandwiched plate portions 28c and 28d extend radially inward.

In the present example, since the sandwiched plate portions 28c and 28d are separated from the first standing plate portion 35a over an entire width in the radial direction, circumferential positions of the sandwiched plate portions 28c and 28d can be set independently of a circumferential position of the first standing plate portion 35a. Therefore, a circumferential dimension X from the side surface (first contact portion) of the second standing plate portion 39 on the other side in the circumferential direction to the side surfaces of the sandwiched plate portions 28c and 28d on the one side in the circumferential direction can be set independently of a circumferential dimension Y from the side surface of the second standing plate portion 39 on the other side in the circumferential direction to an end surface (second contact portion) of the bent portion 48 that constitutes the first standing plate portion 35a on the one side in the circumferential direction. Therefore, in the present example, since circumferential lengths of the connection portions 44c and 44d are regulated, an interference of the sandwiched plate portions 28c and 28d with respect to the torque-receiving surface 19 is made larger than an interference of the first standing plate portion 35a with respect to the side surface of the rotation-in-side coupling portion 10 on the other side in the circumferential direction. Further, also in the case of the present example, the circumferential positions of the sandwiched plate portions 28c and 28d are made different from a circumferential position of the end surface of the bent portion 48, which constitutes the first standing plate portion 35a, on the one side in the circumferential direction.

Also in the case of the pad clip 5a of the present example as described above, the sandwiched plate portions 28c and 28d and the first fixing portion 30a are separated from each other, and are formed by separate flat plates. Therefore, a circumferential dimension X from the side surface of the second standing plate portion 39 on the other side in the circumferential direction to the side surfaces of the sandwiched plate portions 28c and 28d on the one side in the circumferential direction can be set independently of a circumferential dimension Y from the side surface of the second standing plate portion 39 on the other side in the circumferential direction to the end surface of the first standing plate portion 35a (bent portion 48) on the one side in the circumferential direction. Then, in the present example, since the circumferential lengths of the connection portions 44c and 44d are regulated such that the interference of the sandwiched plate portions 28c and 28d is larger than an interference of the first standing plate portion 35a, the side surfaces of the sandwiched plate portions 28c and 28d on the one side in the circumferential direction can be in surface contact with the torque-receiving surface 19 regardless of the bending deformation generated in the main body portion 26a based on elastic deformation of the rotation-inside pressing portions 27a and 27b.

Other configurations and operational effects are the same as those of the first example of the embodiment.

Figure 19:
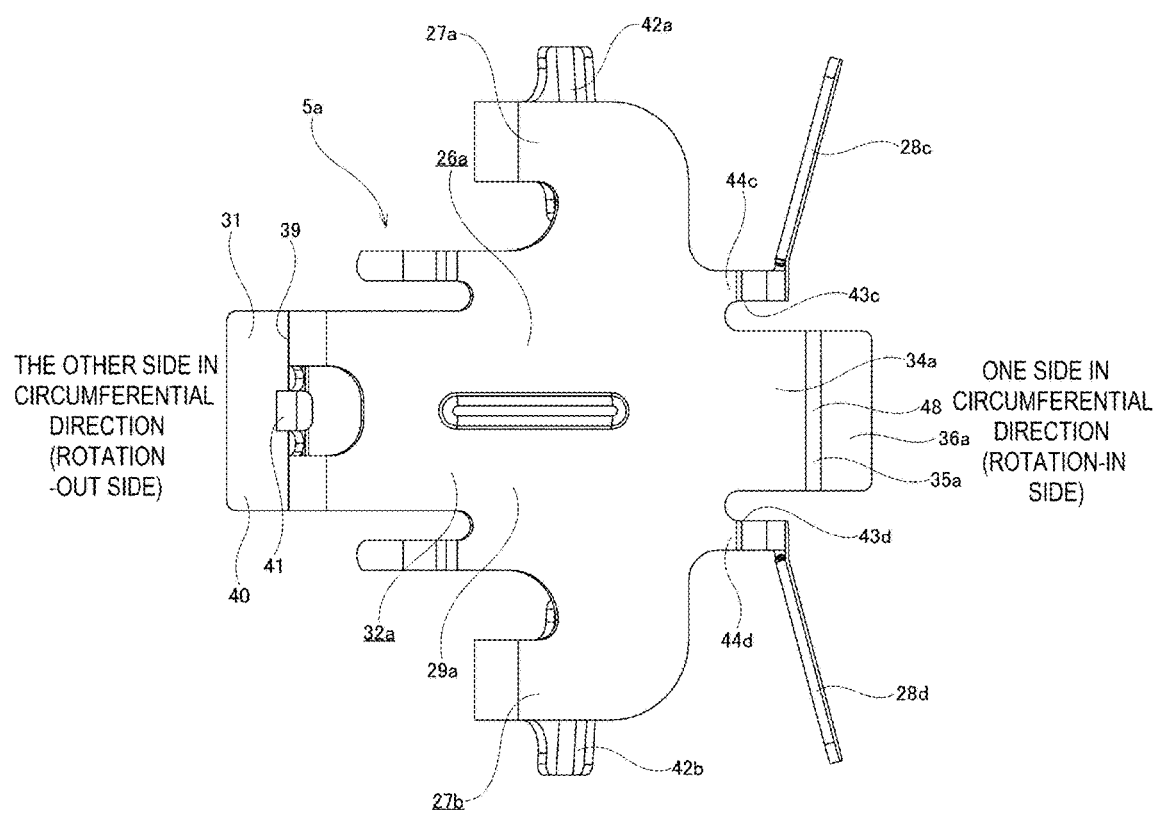
FIG. 19 is a view that shows a modified example of the second example of the embodiment and corresponds to FIG. 8.
Figure 20:
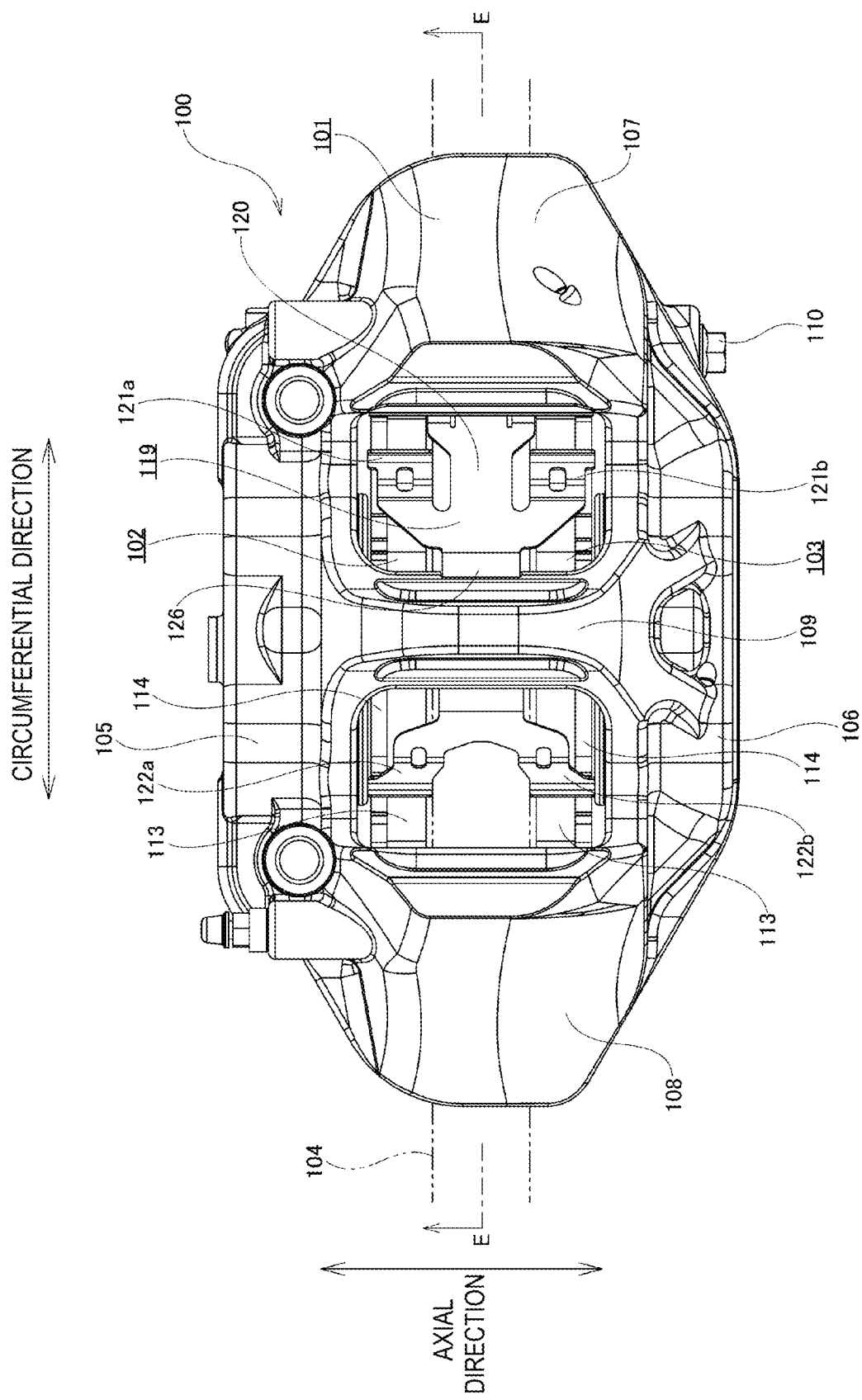
FIG. 20 is a plan view showing a disc brake apparatus having a related-art structure.
Figure 21:
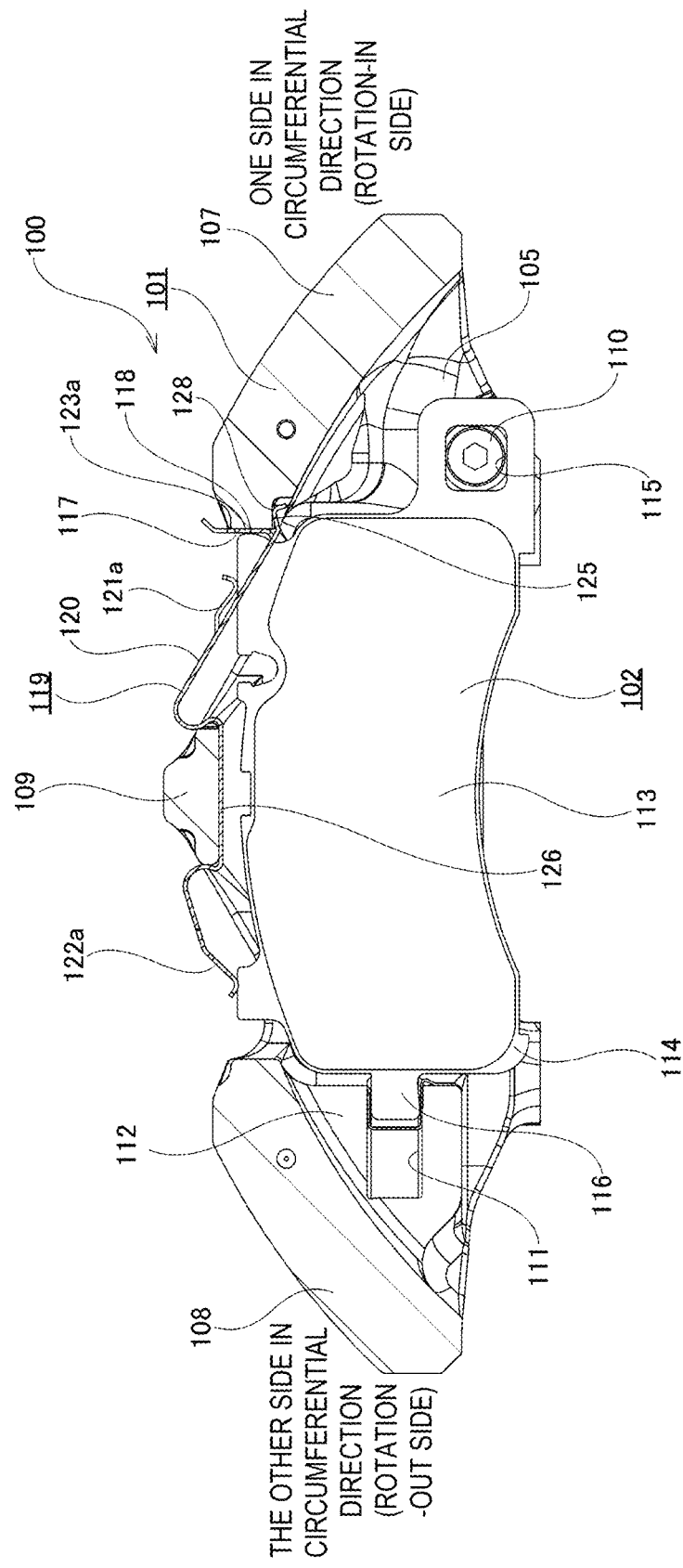
FIG. 21 is a cross-sectional view taken along a line E-E in FIG. 20.
Figure 22A:
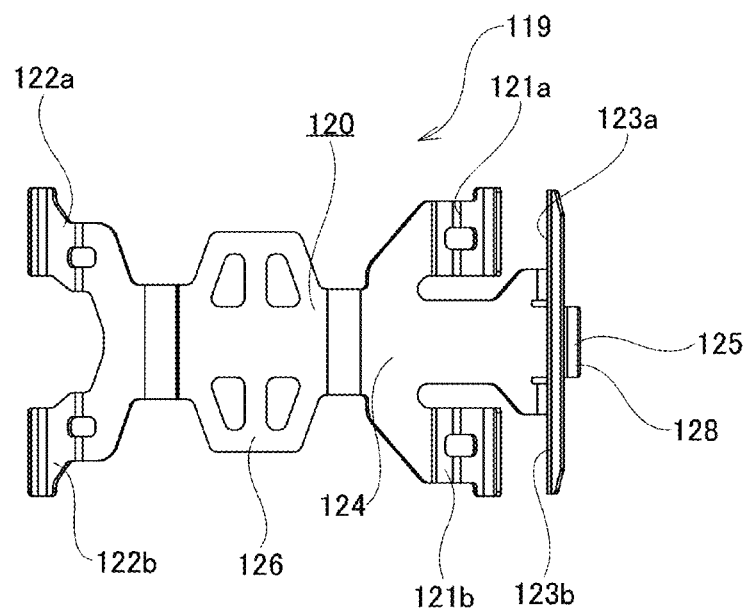
FIGS. 22A to 22C are views showing a pad clip having a related-art structure in which the pad clip is taken out.
Figure 22B:
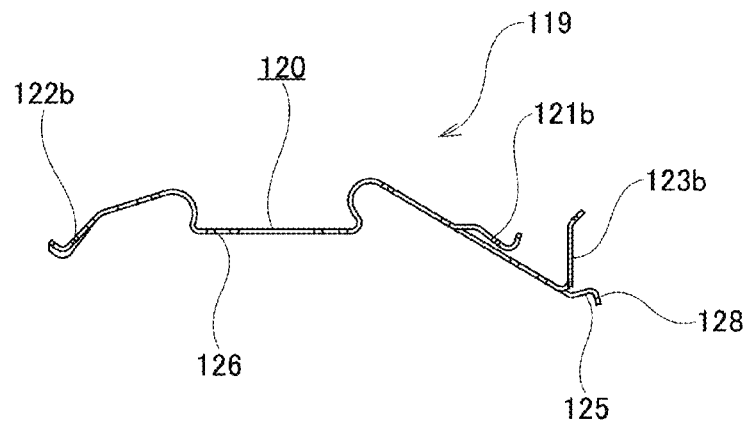
Figure 22C:
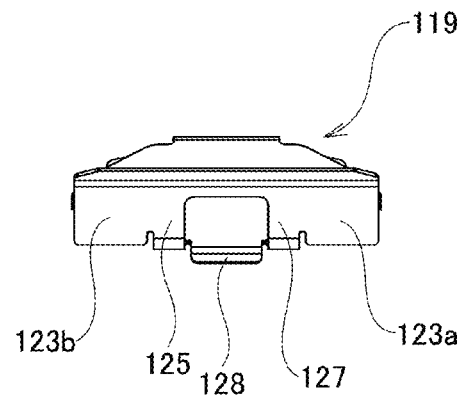

As shown in FIG. 19 showing a modified example of the present example, in a free state of the pad clip 5a, the sandwiched plate portions 28c and 28d can be away from the connection portions 44c and 44d in the axial direction, that is, the sandwiched plate portions 28c and 28d can be inclined in a direction toward the one side in the circumferential direction as the sandwiched plate portions 28c and 28d extend axially outward.

As explained above, according to the one aspect of the invention, there is provided a pad clip for a disc brake apparatus according to an aspect of the present invention is made of a metal plate, and is attached between a pair of coupling portions that are arranged to be separated from each other in a circumferential direction and that are configured to couple an inner body and an outer body in an axial direction to elastically press a pad. The pad clip for the disc brake apparatus includes a main body portion, a pressing portion, and a sandwiched plate portion.

The main body portion includes fixing portions on circumferentially both side portions, and is elastically supported between the pair of coupling portions in a state where the fixing portions are engaged with the coupling portions.

The pressing portion is configured to press an outer peripheral edge portion of the pad radially inward.

The sandwiched plate portion is disposed between a torque-receiving surface provided on a side surface of the coupling portion, which is disposed on one side in a circumferential direction, on the other side in the circumferential direction, and a radially outer portion of a side surface of the pad on the one side in the circumferential direction.

In the pad clip for the disc brake apparatus according to the aspect of the present invention, a circumferential dimension from a first contact portion in contact with a side surface of the coupling portion, which is disposed on the other side in the circumferential direction, on the one side in the circumferential direction in the fixing portion disposed on the other side in the circumferential direction to a side surface of the sandwiched plate portion on the one side in the circumferential direction is available to be set independently of a circumferential dimension from the first contact portion to a second contact portion in contact with the side surface of the coupling portion, which is disposed on the one side in the circumferential direction, on the other side in the circumferential direction in the fixing portion disposed on the one side in the circumferential direction.

Then, the side surface of the sandwiched plate portion on the one side in the circumferential direction is in surface contact with the torque-receiving surface regardless of bending deformation generated in the main body portion based on elastic deformation of the pressing portion.

In other words, a magnitude of an interference of the fixing portion disposed on the one side in the circumferential direction with respect to the coupling portion disposed on the one side in the circumferential direction and a magnitude of an interference of the sandwiched plate portion with respect to the torque-receiving surface can be set separately. The interference of the sandwiched plate portion is set such that a value of the interference of the sandwiched plate portion is not positive (no gap is generated between the sandwiched plate portion and the torque-receiving surface) regardless of bending deformation generated in the main body portion.

A disc brake apparatus according to an aspect of the present invention includes: a caliper including an inner body and an outer body arranged on axially both sides by sandwiching a rotor, and a pair of coupling portions configured to couple the inner body and the outer body in an axial direction; a pad supported so as to be movable in an axial direction with respect to the caliper; and a pad clip that is made of a metal plate, is attached between the pair of coupling portions, and is configured to elastically press the pad, in which the pad clip for the disc brake apparatus according to the aspect of the present invention can be used as the pad clip.

According to the present invention, it is possible to implement a pad clip for a disc brake apparatus and the disc brake apparatus that can prevent generation of a gap between a sandwiched plate portion which constitutes the pad clip and a torque-receiving surface, and that can reduce a drag torque of a pad.

Although the embodiment of the present invention has been described above, the present invention is not limited thereto, and can be appropriately changed without departing from the technical idea of the invention.

The structure of the pad clip of the present invention is not limited to the structure of each example of the embodiment, and can be changed as appropriate. Specifically, the shape, the inclination direction, and the inclination angle of the sandwiched plate portion, the structure of the fixing portion, and the like can be changed as appropriate. Further, the present invention is not limited to the facing piston type disc brake apparatus, and can be applied to a floating caliper type disc brake apparatus.

What is claimed is:

1. A pad clip for a disc brake apparatus, the pad clip being made of a metal plate, the pad clip being attached between a pair of coupling portions that are arranged to be separated from each other in a circumferential direction and that couple an inner body and an outer body in an axial direction to elastically press a pad, the pad clip comprising:
a main body portion including fixing portions on circumferentially both side portions, and elastically supported between the pair of coupling portions in a state where the fixing portions are engaged with the coupling portions;
a pressing portion configured to press an outer peripheral edge portion of the pad radially inward; and
a sandwiched plate portion disposed between a torque-receiving surface provided on a side surface of the coupling portion, which is disposed on one side in a circumferential direction, on the other side in the circumferential direction, and a radially outer portion of a side surface of the pad on the one side in the circumferential direction, wherein
a first circumferential distance that extends from a first contact portion in contact with a side surface of the coupling portion, which is disposed on the other side in the circumferential direction, on the one side in the circumferential direction in the fixing portion disposed on the other side in the circumferential direction to a side surface of the sandwiched plate portion on the one side in the circumferential direction is capable of being set independently of a second circumferential distance that extends from the first contact portion to a second contact portion in contact with the side surface of the coupling portion, which is disposed on the one side in the circumferential direction, on the other side in the circumferential direction in the fixing portion disposed on the one side in the circumferential direction,
the side surface of the sandwiched plate portion on the one side in the circumferential direction is in surface contact with the torque-receiving surface regardless of bending deformation generated in the main body portion based on elastic deformation of the pressing portion,
a cutout portion is formed between the sandwiched plate portion and the fixing portion disposed on the one side in the circumferential direction in an axial direction,
the sandwiched plate portion is connected to the fixing portion disposed on the one side in the circumferential direction via a connection portion formed by forming the cutout portion, and is inclined in a direction toward the one side in the circumferential direction as the sandwiched plate portion is away from the connection portion in a radial direction or an axial direction in a free state, and
in a free state, an inclination angle of the sandwiched plate portion with respect to the second contact portion is larger than 0 degrees and equal to or smaller than 20 degrees.

2. The pad clip for the disc brake apparatus according to claim 1, wherein
an interference of the sandwiched plate portion with respect to the torque-receiving surface is larger than an interference of the fixing portion disposed on the one side in the circumferential direction with respect to the side surface of the coupling portion, which is disposed on the one side in the circumferential direction, on the other side in the circumferential direction.

3. The pad clip for the disc brake apparatus according to claim 1, wherein
in a free state, a circumferential position of the side surface of the sandwiched plate portion on the one side in the circumferential direction and a circumferential position of the second contact portion are different from each other.

4. The pad clip for the disc brake apparatus according to claim 1, wherein
the sandwiched plate portion is connected to a circumferentially intermediate portion of the main body portion via a connection portion formed by forming the cutout portion.

5. The pad clip for the disc brake apparatus according to claim 4, wherein
in a free state, the sandwiched plate portion is inclined in a direction toward the one side in the circumferential direction as the sandwiched plate portion extends away from the connection portion.

6. The pad clip for the disc brake apparatus according to claim 5, wherein
in a free state, an inclination angle of the sandwiched plate portion with respect to the second contact portion is larger than 0 degrees and equal to or smaller than 20 degrees.

7. The pad clip for the disc brake apparatus according to claim 1, wherein
the sandwiched plate portions are provided one by one on axially both sides of the fixing portion disposed on the one side in the circumferential direction.

8. The pad clip for the disc brake apparatus according to claim 1, wherein
the pressing portion presses the pad in a direction away from a rotor in an axial direction.

9. A disc brake apparatus comprising:
a caliper including an inner body and an outer body arranged on axially both sides by sandwiching a rotor, and a pair of coupling portions coupling the inner body and the outer body in an axial direction;
a pad supported so as to be movable in an axial direction with respect to the caliper; and
a pad clip that is made of a metal plate, is attached between the pair of coupling portions, and is configured to elastically press the pad, wherein
the pad clip is the pad clip for the disc brake apparatus according to claim 1.

* * * * *